United States Patent
Gregory et al.

(10) Patent No.: US 12,514,212 B2
(45) Date of Patent: Jan. 6, 2026

(54) REDUCED-FAT PEANUT PRODUCTS AND PLANT LINES

(71) Applicant: Jimmy D. Gregory, Brownfield, TX (US)

(72) Inventors: Jimmy D. Gregory, Brownfield, TX (US); Dylan Quincy Wann, Lubbock, TX (US)

(73) Assignee: Jimmy Gregory, Brownfield, TX (US)

( * ) Notice: Subject to any disclaimer, the term of this patent is extended or adjusted under 35 U.S.C. 154(b) by 185 days.

(21) Appl. No.: 18/372,252

(22) Filed: Sep. 25, 2023

(65) Prior Publication Data

US 2025/0098613 A1    Mar. 27, 2025

(51) Int. Cl.
*A01H 6/54*    (2018.01)
*A01H 5/10*    (2018.01)

(52) U.S. Cl.
CPC .............. *A01H 6/541* (2018.05); *A01H 5/10* (2013.01)

(58) Field of Classification Search
None
See application file for complete search history.

(56) References Cited

U.S. PATENT DOCUMENTS

2021/0176938 A1*    6/2021    Branch .................. A01H 6/541

OTHER PUBLICATIONS

Ozcan 2010 (Journal of Oleo Science 59:1, p. 1-5) (Year: 2010).*
Ozcan 2003 (Grasas y Aceites 54:1, p. 12-18) (Year: 2003).*
Isleib et al 2004 (Journal of Agricultural and Food Chemistry 52: p. 3165-3168) (Year: 2004).*
Wang et al 2010 (Plant Genetic Resources 8:3, p. 232-234) (Year: 2010).*
Dean et al., Content of Some Nutrients in the Core of the Core of the Peanut Germplasm Collection, Peanut Science, 2009, 36(2), pp. 104-120.
U.S. Plant Variety Protection Application No. U.S. PVP 201400315, filed Apr. 29, 2014, Peanut Cultivar 'ACI 236', Kim M. Moore, issued Mar. 30, 2015.
U.S. Plant Variety Protection Application No. U.S. PVP 201400321, filed Apr. 29, 2014, Peanut Cultivar 'ACI 789', Kim M. Moore, issued Mar. 30, 2015.

* cited by examiner

Primary Examiner — Matthew R Keogh
(74) Attorney, Agent, or Firm — Quarles & Brady, LLP

(57) ABSTRACT

The present invention relates to new reduced-fat peanut products and plant lines, including peanut plants, seeds, varieties, and hybrids. The invention further relates to peanut seed having a reduced-fat content of from about 27.9% to about 39.57% and to novel peanut plants and lines which produce seeds having a reduced-fat content of from about 27.9% to about 39.57%. The invention also relates to methods for producing a peanut plant which produces seeds having a reduced-fat content of from about 27.9% to about 39.57% containing in its genetic material one or more transgenes and to the transgenic plants produced by those methods. This invention also relates to peanut cultivars or breeding cultivars and plant parts derived from peanut plants which produce seeds having a reduced-fat content of from about 27.9% to about 39.57% and to methods for producing other peanut cultivars, lines or plant parts derived from peanut plants which produce seeds having a reduced-fat content of from about 27.9% to about 39.57%.

25 Claims, 1 Drawing Sheet

REDUCED-FAT PEANUT PRODUCTS AND PLANT LINES

This application claims the benefit of priority from U.S. provisional patent application Ser. No. 63/410,720 filed on Sep. 28, 2022, which is incorporated herein by reference in its entirety.

BACKGROUND OF THE INVENTION

The present invention relates to new reduced-fat peanut products and reduced-fat plant lines, including peanut plants, seeds, varieties, and hybrids. The invention further relates to peanut seed having a reduced-fat content of from about 27.9% to about 39.57% and to novel peanut plants and lines which produce seeds having a reduced-fat content of from about 27.9% to about 39.57%. The invention further relates to reduced-fat peanut products and plants which produce reduced-fat seeds also having reduced oil content. All publications cited in this application are herein incorporated by reference.

The peanut (*Arachis hypogaea* L.), also referred to as groundpea or groundnut, is an annual herbaceous plant of the legume family. Originally cultivated in South America and the eastern slopes of the Andes mountains, peanut is now grown worldwide in the tropic and temperate zones and is recognized as one of the major oilseed crops and as a rich source of protein. In the United States, peanut production is concentrated primarily in the Southeast (Alabama, Florida, Georgia, Mississippi, South Carolina), the Southwest (New Mexico, Oklahoma, Texas), and Virginia and North Carolina.

The peanut plant grows best in light, sandy soil and requires four to five months of warm weather and an annual rainfall of 20 to 39 inches, or the equivalent in irrigation water. The pea-like yellow flowers form in axillary clusters and only bloom for a short time. Following self-pollination, the stalk at the base of the ovary, called the pedicel, elongates rapidly and turns downward to bury the fruits one to several inches below the ground surface. The peanut pods complete their development 120 to 160 days after planting. The edible peanut seed is also referred to as a kernel and the outer shell is called a pod or hull. During harvest, the entire plant including the roots is removed from the soil. Peanut is particularly susceptible to viruses and fungi during growth and storage.

There are four types of peanuts grown commercially in the U.S.: runner, Virginia, Valencia, and Spanish. The runner type is the primary commercial peanut raised and is used mainly for peanut butter. The Virginia type is mainly used for gourmet snacks. The Valencia type are sweet-flavored peanuts that are usually roasted and sold in their shells or made into peanut butter. Spanish peanuts have a red skin and pronounced nutty flavor due to higher oil content and are used to make peanut candies, shelled salted nuts, and peanut butter.

Peanut is an important and valuable field crop. In 2017, the total U.S. peanut production measured 7.2 billion pounds and peanut yields were 4,072 pounds per acre (National Ag Statistics Service (NASS), USDA, 2018). Peanuts can be processed into many different valuable products, such as shelled or unshelled roasted nuts, peanut butter, oil, peanut flour, and biodiesel, as well as non-food products, livestock feed, fuel, mulch, and manufacturing particle board or fertilizer.

Peanuts are nutrient-dense, rich in protein and oil, and a good source of vitamins and minerals. Mature peanuts contain approximately 25% protein (Dean, L. L. et al., Peanut Science 36:104-120 (2009)). Peanuts are high in fat content and according to the USDA, reference standards of raw, unroasted peanut seeds contain 49.24% total fat (USDA, 2015), with one ounce of raw peanuts containing approximately 12 grams of unsaturated fat, only two grams of saturated fat, and no trans-fat. According to the American peanut council, peanut fat profile contains about 50% mono-unsaturated fatty acids, 33% paraformaldehyde and 14% saturated fatty acids (Ayra, S. S. et al., J Food Sci Tecnol 53:31-41 (2016). In addition, it has been reported that the fat content of peanuts ranges from 44%-56%, mainly consisting of mono- and poly-unsturated fat which is mostly made up of oleic acid and linoleic acid (Arnarson A., Healthline (healthline.com) (May 7, 2019)). Although unsaturated fats are typically considered "good fats", many consumers want low-fat food products. There are numerous lower-fat peanut products available that are produced using costly fat-stripping processes at the food manufacturing level. Therefore, it is desirable to develop peanuts and peanut products and open new markets for food products containing peanuts by providing an all-natural source of raw peanuts that are low in total fat content. This would appeal to consumers seeking a more natural, non-genetically modified product that is healthier for consumption, and manufacturers would benefit from the value-added nature of the product without having to provide value-added inputs artificially.

Methods for producing novel peanut lines through selection are known in the art. Each of the following references is incorporated in its entirety, herein, by reference: Moore, K. M. et al., *J. Heredity* 80(3): 252 (1989); Norden, A. J., *Peanuts, Culture and Uses*. Am. Peanut Res. And Educ. Soc., Stillwater, Okla. (C. T. Wilson ed. 1973); Norden, A. J. in *Hybridization of Crop Plants* (H. H. Hadley ed. 1980); Norden, A. J., et al., Breeding of the cultivated peanut in *Peanut Science and Technology*, (H. E. Pattee ed. 1992); Norden, A. J. et al., *Florida Agr. Res.* 3:16-18 (1984); Knauft, D. A. et al., Peanut, *Peanut Principles of Cultivar Development*, 2:346-384 (Walter R. Fehr ed. 1987).

The foregoing examples of the related art and limitations related therewith are intended to be illustrative and not exclusive. Other limitations of the related art will become apparent to those of skill in the art upon a reading of the specification.

SUMMARY OF THE INVENTION

The following embodiments and aspects thereof are described in conjunction with systems, tools and methods which are meant to be exemplary and illustrative, not limiting in scope. In various embodiments, one or more of the above-described problems have been reduced or eliminated, while other embodiments are directed to other improvements.

According to the invention, there are provided novel peanut lines, botanically known as *Arachis hypogaea* L. that produce seed (peanuts, kernels) with reduced-fat content compared to conventional peanuts. This invention thus relates to the seeds of peanut lines that produce seed with reduced-fat content, to the plants or part(s) thereof, including but not limited to the seed, of peanut lines that produce seed with reduced-fat content, to the plants or part(s) thereof having all of the phenotypic and morphological characteristics of peanut lines that produce seed with reduced-fat content, and to methods for producing a peanut plant produced by crossing peanut varieties that produce seed with reduced-fat content with itself or with another peanut line, and to the creation of variants by mutagenesis, genetic modification or transformation of peanut lines that produce seed with reduced-fat content. The invention further relates to plants produced by the above methods. Additionally, the invention relates to seed and plants of peanut lines that produce seed with reduced-fat content wherein the seed also has reduced oil content.

According to the invention, there is provided a peanut seed having a reduced-fat content of from about 27.9% to about 39.57%. The invention further provides a novel peanut plant which produces seeds having a reduced-fat content of from about 27.9% to about 39.57%. The invention also provides a peanut line consisting essentially of a substantially uniform population of Arachis hypogaea L. plants which produce seeds having a reduced-fat content of from about 27.9% to about 39.57%. The invention also provides reduced-fat peanut products derived from peanut seeds having a fat content of from about 27.9% to about 39.57%. The invention further provides for peanut seed and peanut plants that produce seed having a reduced-fat content of from about 27.9% to about 39.57% wherein the seed also has reduced oil content.

The present invention further relates to methods for producing peanut lines that produce seed having a reduced-fat content of from about 27.9% to about 39.57% by crossing a peanut plant which produces seeds having a fat content of from about 27.9% to about 39.57% with itself, or with another peanut line that does not produce seeds having a fat content of from about 27.9% to about 39.57%, optionally followed by selfing and/or backcrossing, and to the creation of variants by mutagenesis or transformation of peanut plants that produce seed having a fat content of from about 27.9% to about 39.57%. The invention further relates to peanut plants, including hybrid peanut plants, produced by said methods, as well as peanut plants also having reduced oil content.

In one embodiment of the invention, there is provided a novel peanut cultivar designated IPG 2309, which produces seed having a reduced-fat content of from about 27.9% to about 39.57%. Further, the invention relates to peanut cultivar IPG 2309 having reduced oil content. Also provided are peanut plants having the physiological and morphological characteristics of peanut cultivar IPG 2309. This invention thus relates to the seeds of peanut cultivar IPG 2309, to the plants of peanut cultivar IPG 2309, and to methods for producing a peanut plant produced by crossing the peanut cultivar IPG 2309 with itself or another peanut plant, to methods for producing a peanut plant containing in its genetic material one or more transgenes, and to the transgenic peanut plants produced by that method. This invention also relates to methods for producing other peanut cultivars derived from peanut cultivar IPG 2309 and to the peanut cultivar derived by the use of those methods. This invention further relates to hybrid peanut seeds, plants, and plant parts produced by crossing peanut cultivar IPG 2309 with another peanut variety.

In another aspect, the present invention provides regenerable cells for use in tissue culture of peanut plants that produce seed with reduced-fat content, including but not limited to regenerable cells of peanut cultivar IPG 2309. The tissue culture will preferably be capable of regenerating plants having a reduced-fat content of from about 27.9% to about 39.57%, and of regenerating plants having substantially the same genotype as the foregoing peanut plant. Genetic variants of peanut plants that produce seed with reduced-fat content naturally generated through using tissue culture or artificially induced utilizing mutagenic agents or genome editing techniques during tissue culture are aspects of the present invention. Preferably, the regenerable cells in such tissue cultures will be embryos, protoplasts, meristematic cells, callus, pollen, leaves, anthers, pistils, roots, root tips, flowers, seeds, panicles or stems. Still further, the present invention provides peanut plants regenerated from the tissue cultures of the invention, wherein the regenerated peanut plants produce seeds having a reduced-fat content of from about 27.9% to about 39.57%.

The invention further provides methods for developing peanut plants derived from peanut plants that produce seed having a reduced-fat content of from about 27.9% to about 39.57%, including but not limited to peanut cultivar IPG 2309, in a peanut plant breeding program using plant breeding techniques including recurrent selection, backcrossing, pedigree breeding, restriction fragment length polymorphism enhanced selection, genetic marker enhanced selection, and transformation. Seeds, peanut plants, and parts thereof, produced by such breeding methods are also part of the invention.

In another aspect, the present invention provides for single or multiple gene converted plants of peanut plants that produce seed having a reduced-fat content of from about 27.9% to about 39.57%, including but not limited to peanut cultivar IPG 2309. The desired single or multiple transferred gene(s) may preferably be a dominant or recessive allele. Preferably, the single or multiple transferred gene(s) will confer such traits including but not limited to herbicide resistance, insect resistance, resistance to bacterial, fungal, or viral disease, male fertility, male sterility, enhanced nutritional quality, and industrial usage or the transferred gene will have no apparent value except for the purpose of being a marker for variety identification. The single or multiple gene(s) may be a naturally occurring peanut gene or a transgene introduced through genetic engineering techniques.

The invention also relates to methods for producing a peanut plant that produces seed having a reduced-fat content of from about 27.9% to about 39.57%, including but not limited to peanut cultivar IPG 2309, containing in its genetic material one or more transgenes and to the transgenic peanut plant produced by those methods.

The invention also relates to methods of introducing a desired trait into a peanut plant that produces seed having a reduced-fat content of from about 27.9% to about 39.57%, including but not limited to peanut cultivar IPG 2309, comprising crossing a peanut plant that produces seed having a reduced-fat content of from about 27.9% to about 39.57%, including but not limited to peanut cultivar IPG 2309, with a plant of another peanut cultivar that comprises a desired trait to produce progeny plants, wherein the desired trait is selected from the group consisting of male sterility, herbicide resistance, insect resistance, modified fatty acid metabolism, modified carbohydrate metabolism, improved agronomic characteristics, and resistance to bacterial disease, fungal disease or viral disease, selecting one or more progeny plants that have the desired trait to produce selected progeny plants, backcrossing the selected progeny plants with the peanut plant that produces seed having a reduced-fat content of from about 27.9% to about 39.57%, including but not limited to peanut cultivar IPG 2309, to produce backcross progeny plants, and selecting for backcross progeny plants that have the desired trait and produce seed having a reduced-fat content of from about 27.9% to about 39.57%. The method further comprises optionally repeating the backcrossing and selecting two or more times to produce selected third or higher backcross progeny plants that comprise the desired trait and produce seed having a reduced-fat content of from about 27.9% to about 39.57%.

The invention further relates to methods for genetically modifying a peanut plant that produces seed having a reduced-fat content of from about 27.9% to about 39.57%, including but not limited to peanut cultivar IPG 2309, and to the modified peanut plant produced by those methods. The genetic modification methods may include, but are not limited to mutation breeding, genome editing, RNA interference, gene silencing, backcross conversion, genetic transformation, single and multiple gene conversion, and/or direct gene transfer. The invention further relates to a genetically modified peanut plant produced by the above methods, wherein the genetically modified peanut plant comprises the genetic modification and otherwise comprises all of the physiological and morphological characteristics of a peanut plant that produces seed having a reduced-fat content of from about 27.9% to about 39.57%, including but not limited to peanut cultivar IPG 2309.

The invention further relates to the mutant allele(s) conferring the reduced-fat content trait and to molecular markers, single nucleotide polymorphisms, primers, chromosome location(s), and other identifying structures relating to said reduced-fat content trait and mutant allele(s). The invention also provides methods for introducing or transferring the mutant allele(s) conferring the reduced-fat content trait of the present invention into other peanut plants by crossing a peanut plant which lacks said mutant allele(s) with a peanut plant that produces seed having a reduced-fat content of from about 27.9% to about 39.57%, including but not limited to peanut cultivar IPG 2309, harvesting the resultant hybrid seed and growing the hybrid seed to produce hybrid plants, selfing the resulting generations one or more times and selecting the plants that produce seed having a reduced-fat content of from about 27.9% to about 39.57%.

In addition to the exemplary aspects and embodiments described above, further aspects and embodiments will become apparent by study of the following descriptions.

DETAILED DESCRIPTION OF THE INVENTION

Figure 1:
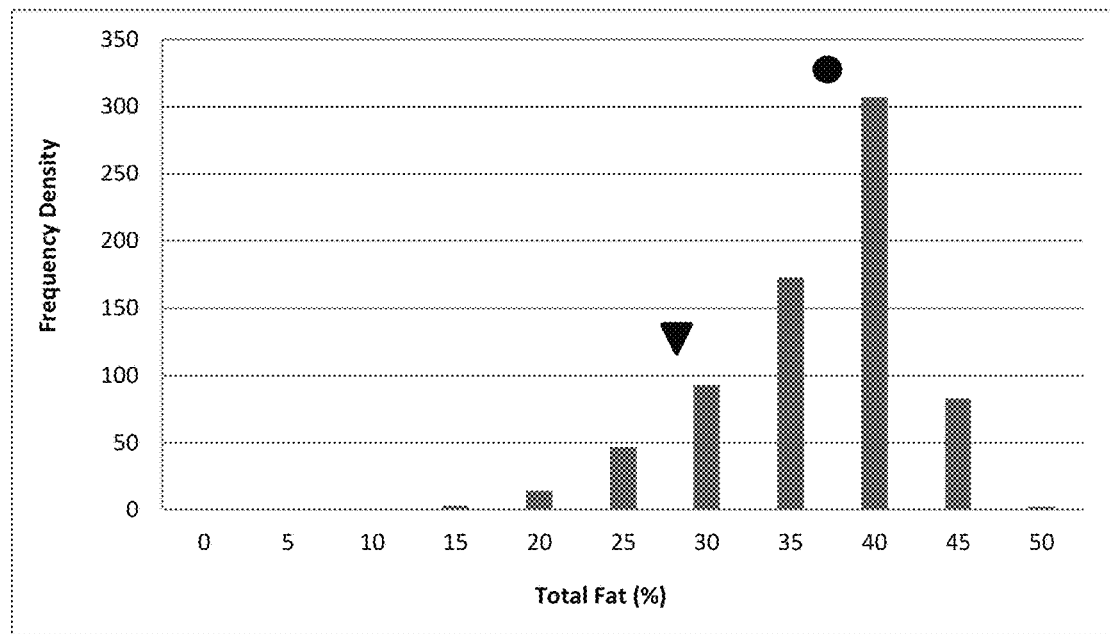
FIG. 1 shows a frequency density histogram of total fat (%) values for an $F_2$ breeding population derived from a cross between IPG 2309 and Georgia-06G (triangle and circle represent the mean total fat content for the reduced-fat (28.1%) and normal-fat (38.6%) parents, respectively).

In the description and tables which follow, a number of terms are used. In order to provide a clear and consistent understanding of the specification and claims, including the scope to be given such terms, the following definitions are provided:

Allele. An allele is any of one or more alternative forms of a gene which relate to one trait or characteristic. In a diploid cell or organism, the two alleles of a given gene occupy corresponding loci on a pair of homologous chromosomes.

Alter. The utilization of up-regulation, down-regulation, or gene silencing.

*Arachis hypogea* L. The domesticated peanut, or groundnut, is an amphidiploid species in the legume or "bean" family and is an annual herbaceous plant.

Backcrossing. Backcrossing is a process in which a breeder successively crosses hybrid progeny back to one of the parents, for example, a first-generation hybrid $F_1$ with one of the parental genotypes of the $F_1$ hybrid.

Cell. Cell as used herein includes a plant cell, whether isolated, in tissue culture or incorporated in a plant or plant part.

Chlorosis. Used to describe a reduced amount of chlorophyll resulting in light or yellow-colored leaves.

Concentric chlorotic ring-spots. Light or dark areas on the leaf in the form concentric circles, ovals, or similar shape not necessarily symmetrical or uniform in appearance.

Cotyledon. A cotyledon is a type of seed leaf. The cotyledon contains the food storage tissues of the seed.

Embryo. The embryo is the small plant contained within a mature seed.

Enzyme. Enzymes are proteins that act as catalysts in all living organisms and serve as compounds that increase chemical reactions in biological systems.

Essentially all the Physiological and Morphological Characteristics.

A plant having essentially all the physiological and morphological characteristics means a plant having the physiological and morphological characteristics of the cultivar, except for the characteristics derived from the converted gene.

Fat usually means any ester of fatty acids, or a mixture of such compounds, most commonly those that occur in living beings or in food. The term often refers specifically to triglycerides that are the main components of vegetable oils. In some instances, fat may more narrowly refer to triglycerides that are solid or semisolid at room temperature. The fatty acids may be monounsaturated fatty acids and saturated fatty acids.

Gene expression. The process by which information encoded in a gene is used to direct the assembly of a functional product, such as a protein.

Gene silencing. The interruption or suppression of the expression of a gene at the level of transcription or translation.

Genetically modified. Describes an organism that has received genetic material from another organism, or had its genetic material modified, resulting in a change in one or more of its phenotypic characteristics. Methods used to modify, introduce, or delete the genetic material may include mutation breeding, genome editing, RNA interference, gene silencing, backcross conversion, genetic transformation, single and multiple gene conversion, and/or direct gene transfer.

Genome editing. A type of genetic engineering in which DNA is inserted, replaced, modified, or removed from a genome using artificially engineered nucleases or other targeted changes using homologous recombination. Examples include but are not limited to use of zinc finger nucleases (ZFNs), TAL effector nucleases (TALENs), meganucleases, CRISPR/Cas9, and other CRISPR related technologies. (Ma et. al., *Molecular Plant*, 9:961-974 (2016); Belhaj et. al., *Current Opinion in Biotechnology*, 32:76-84 (2015)).

Hemizygous. Having or characterized by one or more genes that have no allelic counterparts. Hemizygous pertains to a diploid cell with only one copy of a gene instead of the usual two copies.

Hilum. This refers to the scar left on the seed which marks the place where the seed was attached to the pod prior to it (the seed) being harvested.

Leaflets. These are part of the plant shoot, and they manufacture food for the plant by the process of photosynthesis.

Leaf petiole. The small stalk attaching the leaf blade to the stem.

Leaf spots. A spot on a leaf usually resultant from infection; can be either chlorotic or necrotic and may be ringed, referred to as a ring-spot.

Linkage. Refers to a phenomenon wherein alleles on the same chromosome tend to segregate together more often than expected by chance if their transmission was independent.

Linkage disequilibrium. Refers to a phenomenon wherein alleles tend to remain together in linkage groups when segregating from parents to offspring, with a greater frequency than expected from their individual frequencies.

Locus. A locus confers one or more traits such as, for example, male sterility, insect resistance, disease resistance, and improved yield. The trait may be, for example, conferred by a naturally occurring gene introduced into the genome of the variety by backcrossing, a natural or induced mutation, or a transgene introduced through genetic transformation techniques. A locus may comprise one or more alleles integrated at a single chromosomal location.

Loss of function. As used herein, refers to a complete or partial loss of function or activity of an enzyme or protein.

$M_1$, $M_2$, $M_3$, etc. Used to indicate the generations after a mutational treatment, analogous to filial generation $F_1$, $F_2$, etc. that identifies generations after a hybridization of two individuals that are advanced through self-fertilization.

Maturity Date. Plants are considered mature when about 70% of the pods display a dark brown or black endocarp on the middle upper side of the pod. The endocarp is revealed by removing the exocarp by mechanical scraping or by pressurized water.

Modulating or modulation of expression of a gene. As used herein, refers to changes or alterations to a gene produced by techniques including but not limited to gene suppression, gene down-regulation, gene knock-down, gene mutation, gene silencing, gene (genome) editing, and other techniques that result in a change in the expression of a gene as compared to a wild-type gene.

Mottling. Abnormal coloration on plants, usually a sign of disease or malnutrition.

Multiple Gene Converted (Conversion). Multiple gene converted (conversion) includes plants developed by a plant breeding technique called backcrossing wherein essentially all of the desired morphological and physiological characteristics of a variety are recovered, while retaining two or more genes transferred into the variety via crossing and backcrossing. The term can also refer to the introduction of multiple genes through genetic engineering techniques known in the art.

Non-natural mutation(s). Refers to one or more mutation(s) in a plant that does not occur naturally. Non-natural mutations occur with artificial external intervention, as opposed to spontaneous or hereditary mutations.

Peanut. The seed of a peanut plant, also known as earthnuts, ground nuts, goober peas, monkey nuts, pygmy nuts, and pig nuts. Peanuts are also called seeds and kernels.

Peanut flour. Flour high in protein, often used as a gluten-free solution.

Peanut oil. Often used in cooking, it has a mild flavor, high smoke point, and high monounsaturated content. Variations include aromatic roasted peanut oil, refined peanut oil, extra virgin or cold pressed peanut oil, and peanut extract.

Peanut Rx. An index designed to help growers approximate the magnitude of the risk that they face from diseases in the coming season.

Pedigree Distance. Relationship among generations based on their ancestral links as evidenced in pedigrees. May be measured by the distance of the pedigree from a given starting point in the ancestry.

Percent Identity. Percent identity as used herein refers to the comparison of the homozygous alleles of two peanut varieties. Percent identity is determined by comparing a statistically significant number of the homozygous alleles of two developed varieties. For example, a percent identity of 90% between peanut variety 1 and peanut variety 2 means that the two varieties have the same allele at 90% of their loci.

Percent Similarity. Percent similarity as used herein refers to the comparison of the homozygous alleles of a first peanut variety such as a peanut line of the present invention with another plant, and if the homozygous allele of the first peanut line matches at least one of the alleles from the other plant, then they are scored as similar. Percent similarity is determined by comparing a statistically significant number of loci and recording the number of loci with similar alleles as a percentage. A percent similarity of 90% between a peanut line of the present invention and another plant means that a peanut line of the present invention matches at least one of the alleles of the other plant at 90% of the loci.

Plant. As used herein, the term "plant" includes reference to an immature or mature whole plant, including a plant from which seed or grain or anthers have been removed. A seed or embryo that will produce the plant is also considered to be the plant.

Plant Height. Plant height is taken from the top of the soil to the top node of the plant and is often measured in centimeters.

Plant Parts. As used herein, the term "plant parts" (or a part thereof) includes protoplasts, leaves, stems, roots, root tips, anthers, pistils, seed, grain, embryo, pollen, ovules, cotyledon, hypocotyl, panicles, flower, shoot, tissue, petiole, cells, meristematic cells and the like.

Plastids. Small, double-membraned organelles of plant cells that contain their own DNA and ribosomes. Some plastids, such as the chloroplasts in plant leaves, contain pigments used in photosynthesis.

Pod. This refers to the fruit of a peanut plant. It consists of the hull or shell (pericarp) and the peanut seeds or kernels.

Progeny. As used herein, includes an $F_1$ peanut plant produced from the cross of two peanut plants where at least one plant includes a peanut line of the present invention and progeny further includes, but is not limited to, subsequent $F_2$, $F_3$, $F_4$, $F_5$, $F_6$, $F_7$, $F_8$, $F_9$, and $F_{10}$ generational crosses with the recurrent parental line.

Protein Percent. Peanut seeds contain a considerable amount of protein. Protein is generally measured by NIR spectrophotometry and is reported as percentage basis.

Quantitative Trait Loci (QTL). Quantitative trait loci (QTL) refer to genetic loci that control to some degree numerically representable traits that are usually continuously distributed.

Reduced fat. As used herein, reduced-fat means peanut seed having a fat content of from about 27.9% to about 39.57%. In comparison, the USDA reference standards of raw, unroasted peanut seeds contain 49.24% total fat (USDA, 2015). Reduced fat may also be referred to as low fat.

Regeneration. Regeneration refers to the development of a plant from tissue culture.

Single Gene Converted (Conversion). Single gene converted (conversion) plant refers to plants which are developed by a plant breeding technique called backcrossing with selection wherein essentially all of the desired morphological and physiological characteristics of a variety are recovered in addition to the single gene transferred into the variety via the backcrossing technique or via genetic engineering.

Spotted wilt. A disease of peanut caused by the Tomato Spotted Wilt Virus.

Thrips. Tiny insects which carry and transmit disease. The two most common species being Tobacco thrips (*Frankliniella fusca*) and Western flower thrips (*Frankliniella occidentalis*). They are also referred to as thunderflies, thenderbugs, storm flies, thrunderblights, and corn lice.

Tomato Spotted Wilt Tospovirus (TSWV). A class V virus having a single stranded RNA genome with negative polarity found within the family Bunyaviridae. TSWV is an arbovirus usually vectored by thrips and is common in warm climates such as Asia, America, Europe and Africa.

Total fat. As used herein, total fat is the fat content (% of weight) of mature peanut seeds.

Total Sound Mature Kernels (TSMK). The percentage of SMK (sound mature kernels) riding a screen with 0.64 by 1.91 cm slots plus sound splits (i.e. the sum of SMK and sound splits).

Transgenic. Transgenic refers to plants that have been genetically engineered using recombinant DNA techniques to create plants with new characteristics. A transgenic organism is one that contains a gene or genes that have been artificially inserted instead of the organism acquiring them through reproduction.

The nutritional quality of peanut products depends on the protein content, oil content, and composition of oil. Low genetic variability has been a major bottleneck in genetic enhancement of these nutritional traits in commercial cultivars (Upadhyaya, et al., *Crop Science* 52 (2012)).

The present invention, collectively, is novel peanut germplasm that has been developed through a combination of chemically-induced mutagenesis of select peanut germplasm and repeated field selection and evaluation to produce a set of specific genetics which confer a consistent source of raw peanut products that contain lower fat than conventional raw peanut products. The novel peanut germplasm were developed in such a way that the trait of interest (reduced-fat content) would not be present naturally in *Arachis hypogea* germplasm. In addition, seed protein content appears to be inversely correlated with fat content; thus, higher-protein peanut seed may be simultaneously created with a reduced-fat seed via the same genetics.

The present invention relates to peanut plants that produce seed (peanut seeds, peanuts, or kernels) with a novel kernel fat concentration range of approximately 27.9-39.57%, which represents an approximate 21.6-43.3% reduction in kernel fat concentration from the published USDA reference standard of 49.2% total fat in raw, unroasted peanuts (USDA, 2015). Approximately 83.0% of the total fatty acid content in peanut kernels of the present invention is comprised of oleic acid, whereas approximately 3.1% is comprised of linoleic acid, with the resultant ratio of oleic to linoleic acid being 26.8:1. Plants of the present invention have a commercial seed size distribution of approximately 22% runner Jumbo kernels (21/64"×3/4"), 49% runner Medium kernels (18/64"×3/4 "), and 19% runner No. 1 kernels (16/64"× 3/4").

Peanut cultivar IPG 2309 of the present invention produces peanut seed having reduced-fat content compared to standard cultivars, with IPG 2309 containing approximately 27.9-39.57% kernel fat compared to the USDA standard of 49.2% fat in raw, unroasted peanuts. Peanut cultivar IPG 2309 has the following morphologic and other characteristics (based primarily on data collected in Texas).

TABLE 1

VARIETY DESCRIPTION INFORMATION

Plant:
Growth habit: Prostrate
Flowering on the main stem: None
Branching pattern: Opposite
Branching: Profuse
Maturity:
Region: Texas, United States
Number of days to maturity: 135 to 140
Days earlier than comparison peanut cultivar IPG 392: 5 to 7
Days later than comparison peanut cultivar IPG QR-14: 5 to 7
Leaves:
Arrangement: Opposite, pinnate, and tetrafoliate
Leaflet length: 27.3 mm
Leaflet length/width ratio: 2.18
Flower:
Flower color: Yellow
Days to flower: 25 to 35; indeterminate
Arrangement: Axillary; from leaf axil
Pod:
Shape: Oblong, indehiscent legume
Length: 28.0 mm
Diameter: 13.0 mm
Number of seeds per pod: 2
Pod yield (kg/ha): 3000 to 5000
Surface: Glabrous
Constriction: Medium
Beak: Inconspicuous to pronounced
Seed:
Coat color: Light pink
Coat surface: Smooth
Shape: Cylindrical-tapered ends
Length: 14.0 mm
Width: 9.0 mm
Grams per 100 seeds (8% moisture): 70.3 g The present invention is directed towards peanut plants that produce seed (peanuts) with reduced-fat content compared to conventional peanuts. The present invention relates to new and distinctive peanut plants which produce seeds having a reduced-fat content of from about 27.9% to about 39.57%.

Any methods using peanut plants which produce seeds having a reduced-fat content of from about 27.9% to about 39.57% are part of this invention, including but not limited to: selfing, backcrosses, hybrid production, crosses to populations, and the like. All plants produced using a peanut plant which produces seeds having a reduced-fat content of from about 27.9% to about 39.57% as a parent are within the scope of this invention.

The reduced-fat trait present in peanut plants which produce seeds having a reduced-fat content of from about 27.9% to about 39.57% of the present invention is heritable and has been transferred to numerous different peanut lines. Peanut lines which produce seeds having a reduced-fat content of from about 27.9% to about 39.57% have shown uniformity and stability.

FURTHER EMBODIMENTS OF THE INVENTION

With the advent of molecular biological techniques that have allowed the isolation and characterization of genes that encode specific protein products, scientists in the field of plant biology developed a strong interest in engineering the genome of plants (genetic engineering) to contain and express foreign genes, or additional, or modified versions of native, or endogenous, genes (perhaps driven by different promoters) in order to alter the traits of a plant in a specific manner. Plants altered by genetic engineering are often referred to as 'genetically modified'. Any sequences, such as DNA, whether from a different species or from the same species, which are stably inserted into the cell using transformation are referred to herein collectively as "transgenes" and/or "transgenic events". Transgenes can be moved from one genome to another using breeding techniques which may include crossing, backcrossing or double haploid production. In some embodiments of the invention, a transgenic variant of peanut plants that produce seed having reduced-fat content may contain at least one transgene but could contain at least 1, 2, 3, 4, 5, 6, 7, 8, 9, 10 and/or no more than 15, 14, 13, 12, 11, 10, 9, 8, 7, 6, 5, 4, 3, or 2. Over the last fifteen to twenty years, several methods for producing transgenic plants have been developed, and the present invention, in particular embodiments, also relates to transformed versions of the claimed cultivar.

Culture for expressing desired structural genes and cultured cells is known in the art. Also as known in the art, peanut is transformable and regenerable such that whole plants containing and expressing desired genes under regulatory control may be obtained. General descriptions of plant expression vectors and reporter genes and transformation protocols can be found in Gruber, et al., "Vectors for Plant Transformation", in *Methods in Plant Molecular Biology & Biotechnology* in Glich, et al., (Eds. pp. 89-119, CRC Press, 1993). Moreover, GUS expression vectors and GUS gene cassettes are available from Clone Tech Laboratories, Inc., Palo Alto, California while luciferase expression vectors and luciferase gene cassettes are available from Pro Mega Corp. (Madison, Wisconsin). Methods for transformation and regeneration of peanut cells are known, such as those described in Ozias-Akins, P. et al., *Plant Science* 93:185-194 (1993), Norden, A. J., et al., chapter 4, supra. In addition, specific genes associated with improved peanut traits may be introduced using peanut transformation methods known in the art (Ozias-Akins, P., et al., *Plant Science* 93:185-194 (1993)). One means to obtain peanut oil with a higher percentage of unsaturated fatty acids is through the genetic engineering of plants, such as that described in U.S. Pat. No. 5,510,255 to Knauf, et al. 1996.

General methods of culturing plant tissues are provided for example by Maki, et al., "Procedures for Introducing Foreign DNA into Plants" in *Methods in Plant Molecular Biology & Biotechnology*, Glich, et al., (Eds. pp. 67-88 CRC Press, 1993); and by Phillips, et al., "Cell-Tissue Culture and In-Vitro Manipulation" in *Corn & Corn Improvement,* 3rd Edition; Sprague, et al., (Eds. pp. 345-387 American Society of Agronomy Inc., 1988). Methods of introducing expression vectors into plant tissue include the direct infection or co-cultivation of plant cells with *Agrobacterium tumefaciens*, described for example by Horsch et al., *Science,* 227:1229 (1985). Descriptions of *Agrobacterium* vector systems and methods for *Agrobacterium*-mediated gene transfer are provided by Gruber, et al., supra.

Useful methods include but are not limited to expression vectors introduced into plant tissues using a direct gene transfer method such as microprojectile-mediated delivery, DNA injection, electroporation and the like. More preferably expression vectors are introduced into plant tissues using a microprojectile media delivery system with a biolistic device or using *Agrobacterium*-mediated transformation. Transformant plants obtained with the protoplasm of the invention are intended to be within the scope of this invention.

Plant transformation involves the construction of an expression vector which will function in plant cells. Such a vector comprises DNA comprising a gene under control of or operatively linked to a regulatory element (for example, a promoter). The expression vector may contain one or more such operably linked gene/regulatory element combinations. The vector(s) may be in the form of a plasmid and can be used alone or in combination with other plasmids, to provide transformed peanut plants, using transformation methods as described below to incorporate transgenes into the genetic material of the peanut plant(s).

One embodiment of the invention is a process for producing a reduced-fat peanut line of the present invention further comprising a desired trait, said process comprising introducing a transgene that confers a desired trait to a peanut plant of a reduced-fat peanut line of the present invention. Another embodiment is the product produced by this process. In one embodiment the desired trait may be one or more of herbicide resistance, insect resistance, disease resistance, decreased phytate, or modified fatty acid or carbohydrate metabolism. The specific gene may be any known in the art or listed herein, including: a polynucleotide conferring resistance to imidazolinone, dicamba, sulfonylurea, glyphosate, glufosinate, triazine, benzonitrile, cyclohexanedione, phenoxy proprionic acid, and L-phosphinothricin; a polynucleotide encoding a *Bacillus thuringiensis* polypeptide; a polynucleotide encoding phytase, FAD-2, FAD-3, galactinol synthase, or a raffinose synthetic enzyme; or a polynucleotide conferring resistance to rust (*Puccinia arachidis*), early and late leaf spot (*Cercospora arachidicola* and *Cercosporidium personatum*), web blotch (Didymella *arachidicola*), pepper spot (*Leptosphaerulina crassiasca*), TSWV, atmospheric scorch, chemical burn, iron chlorosis, potato leafhopper (*Empoasca fabae*) seedling disease (*Rhizoctonia solani, Pythium* spp., *Fusarium* spp. and others), yellow mold (*Aspergillus flavus, Aspergillus parasiticus*), root knot nematode (*Meloidogyne arenaria*) root lesion nematode, southern blight (*Sclerotium rolfsii*), sclerotinia blight (*Sclerotinia minor*), Rhizoctonia pod, peg and limb rot (*Rhizoctonia solani*), *pythium* pod rot (*Pythium myriotylum*), botrytis blight (*Botrytis cinerea*), black mold (*Aspergillus niger*), blackhull (*Thielaviopsis basicola*), phymatotrichum root rot (*Phymatotrichum omnivorum*), and tooth fungus (*Phanerochaeta* sp.).

Expression Vectors for Transformation: Marker Genes

Expression vectors include at least one genetic marker, operably linked to a regulatory element (a promoter, for example) that allows transformed cells containing the marker to be either recovered by negative selection, i.e., inhibiting growth of cells that do not contain the selectable marker gene, or by positive selection, i.e., screening for the product encoded by the genetic marker. Many commonly used selectable marker genes for plant transformation are well known in the transformation arts, and include, for example, genes that code for enzymes that metabolically detoxify a selective chemical agent which may be an antibiotic or an herbicide, or genes that encode an altered target which is insensitive to the inhibitor. A few positive selection methods are also known in the art.

One commonly used selectable marker gene for plant transformation is the neomycin phosphotransferase II (nptII) gene, isolated from transposon Tn5, which when placed under the control of plant regulatory signals confers resistance to kanamycin. Fraley et al., *Proc. Natl. Acad. Sci. U.S.A.*, 80:4803 (1983). Another commonly used selectable marker gene is the hygromycin phosphotransferase gene which confers resistance to the antibiotic hygromycin. Vanden Elzen et al., *Plant Mol. Biol.*, 5:299 (1985).

Additional selectable marker genes of bacterial origin that confer resistance to antibiotics include gentamycin acetyl transferase, streptomycin phosphotransferase, and aminoglycoside-3'-adenyl transferase, the bleomycin resistance determinant. Hayford et al., *Plant Physiol.* 86:1216 (1988); Jones et al., *Mol. Gen. Genet.*, 210:86 (1987); Svab et al., *Plant Mol. Biol.* 14:197 (1990); Hille et al., *Plant Mol. Biol.* 7:171 (1986). Other selectable marker genes confer resistance to herbicides such as glyphosate, glufosinate or bromoxynil. Comai et al., *Nature* 317:741-744 (1985), Gordon-Kamm et al., *Plant Cell* 2:603-618 (1990) and Stalker et al., *Science* 242:419-423 (1988).

Selectable marker genes for plant transformation not of bacterial origin include, for example, mouse dihydrofolate reductase, plant 5-enolpyruvylshikimate-3-phosphate synthase and plant acetolactate synthase. Eichholtz et al., *Somatic Cell Mol. Genet.* 13:67 (1987), Shah et al., *Science* 233:478 (1986), Charest et al., *Plant Cell Rep.* 8:643 (1990).

Another class of marker genes for plant transformation requires screening of presumptively transformed plant cells rather than direct genetic selection of transformed cells for resistance to a toxic substance such as an antibiotic. These genes are particularly useful to quantify or visualize the spatial pattern of expression of a gene in specific tissues and are frequently referred to as reporter genes because they can be fused to a gene or gene regulatory sequence for the investigation of gene expression. Commonly used genes for screening presumptively transformed cells include 0-glucuronidase (GUS, 0-galactosidase, luciferase and chloramphenicol acetyltransferase. Jefferson, R. A., Plant Mol. Biol. Rep. 5:387 (1987), Teeri et al., *EMBO J.* 8:343 (1989), Koncz et al., *Proc. Natl. Acad. Sci U.S.A.* 84:131 (1987), DeBlock et al., *EMBO J.* 3:1681 (1984). Another approach to the identification of relatively rare transformation events has been use of a gene that encodes a dominant constitutive regulator of the *Zea mays* anthocyanin pigmentation pathway. Ludwig et al., *Science* 247:449 (1990).

In vivo methods for visualizing GUS activity that do not require destruction of plant tissue are available. Molecular Probes publication 2908, IMAGENE GREEN, p. 1-4 (1993) and Naleway et al., *J. Cell Biol.* 115:151a (1991). However, these in vivo methods for visualizing GUS activity have not proven useful for recovery of transformed cells because of low sensitivity, high fluorescent backgrounds and limitations associated with the use of luciferase genes as selectable markers.

More recently, a gene encoding Green Fluorescent Protein (GFP) has been utilized as a marker for gene expression in prokaryotic and eukaryotic cells. Chalfie et al., *Science* 263:802 (1994). GFP and mutants of GFP may be used as screenable markers.

Expression Vectors for Transformation: Promoters

Genes included in expression vectors must be driven by nucleotide sequence comprising a regulatory element, for example, a promoter. Several types of promoters are now well known in the transformation arts, as are other regulatory elements that can be used alone or in combination with promoters.

As used herein, "promoter" includes reference to a region of DNA upstream from the start of transcription and involved in recognition and binding of RNA polymerase and other proteins to initiate transcription. A "plant promoter" is a promoter capable of initiating transcription in plant cells. Examples of promoters under developmental control include promoters that preferentially initiate transcription in certain tissues, such as leaves, roots, seeds, fibers, xylem vessels, tracheids, or sclerenchyma. Such promoters are referred to as "tissue-preferred". Promoters which initiate transcription only in certain tissue are referred to as "tissue-specific". A "cell type" specific promoter primarily drives expression in certain cell types in one or more organs, for example, vascular cells in roots or leaves. An "inducible" promoter is a promoter which is under environmental control. Examples of environmental conditions that may affect transcription by inducible promoters include anaerobic conditions or the presence of light. Tissue-specific, tissue-preferred, cell type specific, and inducible promoters constitute the class of "non-constitutive" promoters. A "constitutive" promoter is a promoter which is active under most environmental conditions.

A. Inducible Promoters—An inducible promoter is operably linked to a gene for expression in peanut. Optionally, the inducible promoter is operably linked to a nucleotide sequence encoding a signal sequence which is operably linked to a gene for expression in peanut. With an inducible promoter the rate of transcription increases in response to an inducing agent.

Any inducible promoter can be used in the instant invention. See Ward et al., *Plant Mol. Biol.* 22:361-366 (1993). Exemplary inducible promoters include, but are not limited to, that from the ACEI system which responds to copper (Meft et al., *PNAS* 90:4567-4571 (1993)); In2 gene from maize which responds to benzenesulfonamide herbicide safeners (Hershey et al., *Mol. Gen Genetics* 227:229-237 (1991) and Gatz et al., *Mol. Gen. Genetics* 243:32-38 (1994)) or Tet repressor from Tn10 (Gatz et al., *Mol. Gen. Genetics* 227:229-237 (1991)). A particularly preferred inducible promoter is a promoter that responds to an inducing agent to which plants do not normally respond. An exemplary inducible promoter is the inducible promoter from a steroid hormone gene, the transcriptional activity of which is induced by a glucocorticosteroid hormone (Schena et al., *Proc. Natl. Acad. Sci. U.S.A.* 88:0421 (1991)).

B. Constitutive Promoters—A constitutive promoter is operably linked to a gene for expression in peanut or the constitutive promoter is operably linked to a nucleotide sequence encoding a signal sequence which is operably linked to a gene for expression in peanut.

Many different constitutive promoters can be utilized in the instant invention. Exemplary constitutive promoters include, but are not limited to, the promoters from plant viruses such as the 35S promoter from CaMV (Odell et al., *Nature* 313:810-812 (1985)) and the promoters from such genes as rice actin (McElroy et al., *Plant Cell* 2:163-171 (1990)); ubiquitin (Christensen et al., *Plant Mol. Biol.* 12:619-632 (1989) and Christensen et al., *Plant Mol. Biol.* 18:675-689 (1992)); pEMU (Last et al., *Theor. Appl. Genet.* 81:581-588 (1991)); MAS (Velten et al., *EMBO J.* 3:2723-2730 (1984)) and maize H3 histone (Lepetit et al., *Mol. Gen. Genetics* 231:276-285 (1992) and Atanassova et al., *Plant Journal* 2 (3): 291-300 (1992)).

The ALS promoter, Xbal/Ncol fragment 5' to the *Brassica napus* ALS3 structural gene (or a nucleotide sequence similarity to said Xbal/Ncol fragment), represents a particularly useful constitutive promoter. See PCT application WO96/30530.

C. Tissue-specific or Tissue-preferred Promoters—A tissue-specific promoter is operably linked to a gene for expression in peanut. Optionally, the tissue-specific promoter is operably linked to a nucleotide sequence encoding a signal sequence which is operably linked to a gene for expression in peanut. Plants transformed with a gene of interest operably linked to a tissue-specific promoter produce the protein product of the transgene exclusively, or preferentially, in a specific tissue.

Any tissue-specific or tissue-preferred promoter can be utilized in the instant invention. Exemplary tissue-specific or tissue-preferred promoters include, but are not limited to, a root-preferred promoter, such as that from the phaseolin gene (Murai et al., *Science* 23:476-482 (1983) and Sengupta-Gopalan et al., *Proc. Natl. Acad. Sci. U.S.A.* 82:3320-3324 (1985)); a leaf-specific and light-induced promoter such as that from cab or rubisco (Simpson et al., *EMBO J.* 4(11):2723-2729 (1985) and Timko et al., *Nature* 318:579-582 (1985)); an anther-specific promoter such as that from LAT52 (Twell et al., *Mol. Gen. Genetics* 217:240-245 (1989)); a pollen-specific promoter such as that from Zm13 (Guerrero et al., *Mol. Gen. Genetics* 244:161-168 (1993)) or a microspore-preferred promoter such as that from apg (Twell et al., *Sex. Plant Reprod.* 6:217-224 (1993)).

Signal Sequences for Targeting Proteins to Subcellular Compartments

Transport of protein produced by transgenes to a subcellular compartment such as the chloroplast, vacuole, peroxisome, glyoxysome, cell wall or mitochondrion or for secretion into the apoplast, is accomplished by means of operably linking the nucleotide sequence encoding a signal sequence to the 5' and/or 3' region of a gene encoding the protein of interest. Targeting sequences at the 5' and/or 3' end of the structural gene may determine, during protein synthesis and processing, where the encoded protein is ultimately compartmentalized.

The presence of a signal sequence directs a polypeptide to either an intracellular organelle or subcellular compartment or for secretion to the apoplast. Many signal sequences are known in the art. See, for example Becker et al., *Plant Mol. Biol.* 20:49 (1992); Close, P. S., *Master's Thesis, Iowa State University* (1993); Knox, C., et al., *Plant Mol. Biol.* 9:3-17 (1987); Lerner et al., *Plant Physiol.* 91:124-129 (1989); Fontes et al., *Plant Cell* 3:483-496 (1991); Matsuoka et al., *Proc. Natl. Acad. Sci.* 88:834 (1991); Gould et al., *J. Cell. Biol.* 108:1657 (1989); Creissen et al., *Plant J.* 2:129 (1991); Kalderon, et al., *Cell* 39:499-509 (1984); Steifel, et al., *Plant Cell* 2:785-793 (1990).

Foreign Protein Genes and Agronomic Genes

With transgenic plants according to the present invention, a foreign protein can be produced in commercial quantities. Thus, techniques for the selection and propagation of transformed plants, which are well understood in the art, yield a plurality of transgenic plants which are harvested in a conventional manner, and a foreign protein then can be extracted from a tissue of interest or from total biomass. Protein extraction from plant biomass can be accomplished by known methods which are discussed, for example, by Heney and Orr, *Anal. Biochem.* 114:92-6 (1981).

According to an embodiment, the transgenic plant provided for commercial production of foreign protein is peanut. In another embodiment, the biomass of interest is seed. For the relatively small number of transgenic plants that show higher levels of expression, a genetic map can be generated, primarily via conventional RFLP, PCR and SSR analysis, which identifies the approximate chromosomal location of the integrated DNA molecule. For exemplary methodologies in this regard, see Glick and Thompson, Methods in Plant Molecular Biology and Biotechnology *CRC Press, Boca Raton* 269:284 (1993).

Map information concerning chromosomal location is useful for proprietary protection of a subject transgenic plant. If unauthorized propagation is undertaken and crosses made with other germplasm, the map of the integration region can be compared to similar maps for suspect plants, to determine if the latter have a common parentage with the subject plant. Map comparisons would involve hybridizations, RFLP, PCR, SSR and sequencing, all of which are conventional techniques.

Through the transformation of peanut, the expression of genes can be altered to enhance disease resistance, insect resistance, herbicide resistance, agronomic quality and other traits. Transformation can also be used to insert DNA sequences which control or help control male-sterility. DNA sequences native to peanut as well as non-native DNA sequences can be transformed into peanut and used to alter levels of native or non-native proteins. Various promoters, targeting sequences, enhancing sequences, and other DNA sequences can be inserted into the genome for the purpose of altering the expression of proteins. Reduction of the activity of specific genes (also known as gene silencing, or gene suppression) is desirable for several aspects of genetic engineering in plants.

Many techniques for gene silencing are well known to one of skill in the art, including but not limited to knock-outs (such as by insertion of a transposable element such as mu (Vicki Chandler, The Maize Handbook ch. 118 (Springer-Verlag 1994) or other genetic elements such as a FRT, Lox or other site specific integration site, antisense technology (see, e.g., Sheehy et al. (1988) PNAS USA 85:8805-8809; and U.S. Pat. Nos. 5,107,065; 5,453,566; and 5,759,829); co-suppression (e.g., Taylor (1997) Plant Cell 9:1245; Jorgensen (1990) Trends Biotech. 8(12):340-344; Flavell (1994) PNAS USA 91:3490-3496; Finnegan et al. (1994) Bio/Technology 12: 883-888; and Neuhuber et al. (1994) Mol. Gen. Genet. 244:230-241); RNA interference (Napoli et al. (1990) Plant Cell 2:279-289; U.S. Pat. No. 5,034,323; Sharp (1999) Genes Dev. 13:139-141; Zamore et al. (2000) Cell 101:25-33; and Montgomery et al. (1998) PNAS USA 95:15502-15507), virus-induced gene silencing (Burton, et al. (2000) Plant Cell 12:691-705; and Baulcombe (1999) Curr. Op. Plant Bio. 2:109-113); target-RNA-specific ribozymes (Haseloff et al. (1988) Nature 334: 585-591); hairpin structures (Smith et al. (2000) Nature 407:319-320; WO 99/53050; and WO 98/53083); MicroRNA (Aukerman & Sakai (2003) Plant Cell 15:2730-2741); ribozymes (Steinecke et al. (1992) EMBO J. 11:1525; and Perriman et al. (1993) Antisense Res. Dev. 3:253); oligonucleotide mediated targeted modification (e.g., WO 03/076574 and WO 99/25853); Zn-finger targeted molecules (e.g., WO 01/52620; WO 03/048345; and WO 00/42219); and other methods or combinations of the above methods known to those of skill in the art.

Likewise, by means of the present invention, agronomic genes can be expressed in transformed plants. More particularly, plants can be genetically engineered to express various phenotypes of agronomic interest. Exemplary genes implicated in this regard include, but are not limited to, those categorized below:

1. Genes that Confer Resistance to Pests or Disease and that Encode:

A. Plant disease resistance genes. Plant defenses are often activated by specific interaction between the product of a disease resistance gene (R) in the plant and the product of a corresponding avirulence (Avr) gene in the pathogen. A plant cultivar can be transformed with cloned resistance gene to engineer plants that are resistant to specific pathogen strains. See, for example Jones et al., Science 266:789 (1994) (cloning of the tomato Cf-9 gene for resistance to *Cladosporium fulvum*); Martin et al., Science 262:1432 (1993) (tomato Pto gene for resistance to *Pseudomonas syringae* pv. tomato encodes a protein kinase); Mindrinos et al., Cell 78:1089 (1994) (*Arabidopsis* RSP2 gene for resistance to *Pseudomonas syringae*).

B. A *Bacillus thuringiensis* protein, a derivative thereof or a synthetic polypeptide modeled thereon. See, for example, Geiser et al., Gene 48:109 (1986), who disclose the cloning and nucleotide sequence of a Bt δ-endotoxin gene. Moreover, DNA molecules encoding δ-endotoxin genes can be purchased from American Type Culture Collection, Manassas, Virginia, for example, under ATCC Accession Nos. 40098, 67136, 31995 and 31998.

C. A lectin. See, for example, the disclosure by Van Damme et al., *Plant Molec. Biol.* 24:25 (1994), who disclose the nucleotide sequences of several *Clivia miniata* mannose-binding lectin genes.

D. A vitamin-binding protein such as avidin. See PCT application US93/06487. The application teaches the use of avidin and avidin homologues as larvicides against insect pests.

E. An enzyme inhibitor, for example, a protease or proteinase inhibitor or an amylase inhibitor. See, for example, Abe et al., *J. Biol. Chem.* 262:16793 (1987) (nucleotide sequence of rice cysteine proteinase inhibitor), Huub et al., *Plant Molec. Biol.* 21:985 (1993) (nucleotide sequence of cDNA encoding tobacco proteinase inhibitor I), Sumitani et al., *Biosci. Biotech. Biochem.* 57:1243 (1993) (nucleotide sequence of *Streptomyces nitrosporeus* α-amylase inhibitor).

F. An insect-specific hormone or pheromone such as an ecdysteroid and juvenile hormone, a variant thereof, a mimetic based thereon, or an antagonist or agonist thereof. See, for example, the disclosure by Hammock et al., Nature 344:458 (1990), of baculovirus expression of cloned juvenile hormone esterase, an inactivator of juvenile hormone.

G. An insect-specific peptide or neuropeptide which, upon expression, disrupts the physiology of the affected pest. For example, see the disclosures of Regan, *J. Biol. Chem.* 269:9 (1994) (expression cloning yields DNA coding for insect diuretic hormone receptor), and Pratt et al., *Biochem. Biophys. Res. Comm.* 163:1243 (1989) (an allostatin is identified in *Diploptera puntata*); Chattopadhyay, et al., Critical Reviews in Microbiology, 30(1):33-54 (2004); Zjawiony, J Nat Prod, 67(2):300-310 (2004); Carlini & Grossi-de-Sa, Toxicon, 40(11):1515-1539 (2002); Ussuf, et al., Curr Sci., 80(7):847-853 (2001); Vasconcelos & Oliveira, Toxicon, 44(4):385-403 (2004). See also U.S. Pat. No. 5,266,317 to Tomalski et al., who disclose genes encoding insect-specific, paralytic neurotoxins.

H. An insect-specific venom produced in nature by a snake, a wasp, etc. For example, see Pang et al., Gene 116:165 (1992), for disclosure of heterologous expression in plants of a gene coding for a scorpion insectotoxic peptide.

I. An enzyme responsible for a hyper-accumulation of a monoterpene, a sesquiterpene, a steroid, a hydroxamic acid, a phenylpropanoid derivative or another non-protein molecule with insecticidal activity.

J. An enzyme involved in the modification, including the post-translational modification, of a biologically active molecule; for example, a glycolytic enzyme, a proteolytic enzyme, a lipolytic enzyme, a nuclease, a cyclase, a transaminase, an esterase, a hydrolase, a phosphatase, a kinase, a phosphorylase, a polymerase, an elastase, a chitinase and a glucanase, whether natural or synthetic. See PCT application WO 93/02197 in the name of Scott et al., which discloses the nucleotide sequence of a callase gene. DNA molecules which contain chitinase-encoding sequences can be obtained, for example, from the ATCC under Accession Nos. 39637 and 67152. See also Kramer et al., Insect *Biochem. Molec. Biol.* 23:691 (1993), who teach the nucleotide sequence of a cDNA encoding tobacco hornworm chitinase, and Kawalleck et al., *Plant Molec. Biol.* 21:673 (1993), who provide the nucleotide sequence of the parsley ubi4-2 polyubiquitin gene, U.S. Pat. Nos. 7,145,060, 7,087,810, and 6,563,020.

K. A molecule that stimulates signal transduction. For example, see the disclosure by Botella et al., *Plant Molec. Biol.* 24:757 (1994), of nucleotide sequences for mung bean calmodulin cDNA clones, and Griess et al., *Plant Physiol.* 104:1467 (1994), who provide the nucleotide sequence of a maize calmodulin cDNA clone.

L. A hydrophobic moment peptide. See PCT application WO95/16776 (disclosure of peptide derivatives of Tachyplesin which inhibit fungal plant pathogens) and PCT application WO95/18855 (teaches synthetic antimicrobial peptides that confer disease resistance), the respective contents of which are hereby incorporated by reference.

M. A membrane permease, a channel former or a channel blocker. For example, see the disclosure of Jaynes et al., *Plant Sci* 89:43 (1993), of heterologous expression of a cecropin-β, lytic peptide analog to render transgenic tobacco plants resistant to *Pseudomonas solanacearum*.

N. A viral-invasive protein or a complex toxin derived therefrom. For example, the accumulation of viral coat proteins in transformed plant cells imparts resistance to viral infection and/or disease development effected by the virus from which the coat protein gene is derived, as well as by related viruses. See Beachy et al., *Ann. Rev. Phytopathol.* 28:451 (1990). Coat protein-mediated resistance has been conferred upon transformed plants against alfalfa mosaic virus, cucumber mosaic virus, tobacco streak virus, potato virus X, potato virus Y, tobacco etch virus, tobacco rattle virus and tobacco mosaic virus. Id.

O. An insect-specific antibody or an immunotoxin derived therefrom. Thus, an antibody targeted to a critical metabolic function in the insect gut would inactivate an affected enzyme, killing the insect. Cf. Taylor et al., Abstract #497, Seventh Int'l Symposium on Molecular Plant-Microbe Interactions (Edinburgh, Scotland) (1994) (enzymatic inactivation in transgenic tobacco via production of single-chain antibody fragments).

P. A virus-specific antibody. See, for example, Tavladoraki et al., Nature 366:469 (1993), who show that transgenic plants expressing recombinant antibody genes are protected from virus attack.

Q. A developmental-arrestive protein produced in nature by a pathogen or a parasite. Thus, fungal endo-α-1, 4-D-polygalacturonases facilitate fungal colonization and plant nutrient release by solubilizing plant cell wall homo-α-1,4-D-galacturonase. See Lamb et al., *Bio/Technology* 10:1436 (1992). The cloning and characterization of a gene which encodes a bean endopolygalacturonase-inhibiting protein is described by Toubart et al., *Plant J.* 2:367 (1992).

R. A developmental-arrestive protein produced in nature by a plant. For example, Logemann et al., *Bio/Technology* 10:305 (1992), have shown that transgenic plants expressing the barley ribosome-inactivating gene have an increased resistance to fungal disease.

S. Genes involved in the Systemic Acquired Resistance (SAR) Response and/or the pathogenesis-related genes. Briggs, S., Current Biology, 5(2) (1995); Pieterse & Van Loon, Curr. Opin. Plant Bio., 7(4):456-64 (2004); and Somssich, Cell, 113(7):815-6 (2003).

T. Antifungal genes. See, Cornelissen and Melchers, Plant Physiol., 101:709-712 (1993); Parijs, et al., Planta, 183:258-264 (1991); and Bushnell, et al., Can. J. of Plant Path., 20(2):137-149 (1998). See also, U.S. Pat. No. 6,875,907.

U. Detoxification genes, such as for fumonisin, beauvericin, moniliformin, and zearalenone and their structurally-related derivatives. See, for example, U.S. Pat. No. 5,792,931.

V. Cystatin and cysteine proteinase inhibitors. See, U.S. Pat. No. 7,205,453.

W. Defensin genes. See, WO 03/000863 and U.S. Pat. No. 6,911,577.

X. Genes conferring resistance to nematodes, such as root knot nematode and root lesion nematode. See, e.g., PCT Applications WO 96/30517, WO 93/19181, and WO 03/033651; Urwin, et al., Planta, 204:472-479 (1998); Williamson, Curr Opin Plant Bio., 2(4):327-31 (1999).

Y. Genes that confer resistance to *Phytophthora* Root Rot, such as the Rps 1, Rps 1-a, Rps 1-b, Rps 1-c, Rps 1-d, Rps 1-e, Rps 1-k, Rps 2, Rps 3-a, Rps 3-b, Rps 3-c, Rps 4, Rps 5, Rps 6, Rps 7, and other Rps genes. See, for example, Shoemaker, et al., *Phytophthora* Root Rot Resistance Gene Mapping in Soybean, Plant Genome IV Conference, San Diego, Calif (1995).

Z. Genes that confer resistance to Brown Stem Rot, such as described in U.S. Pat. No. 5,689,035 and incorporated by reference for this purpose.

Any of the above-listed disease or pest resistance genes (A-Z) can be introduced into a claimed reduced-fat peanut line of the invention through a variety of means including, but not limited to, transformation and crossing.

2. Genes that Confer Resistance to an Herbicide, for Example:

A. An herbicide that inhibits the growing point or meristem, such as an imidazolinone, or a sulfonylurea. Exemplary genes in this category code for mutant ALS and AHAS enzyme as described, for example, by Lee et al., EMBO J. 7:1241 (1988), and Miki et al., Theor. Appl. Genet. 80:449 (1990), respectively. Additionally, a meristematic inhibitor herbicide such as pendimethalin.

B. Glyphosate (resistance conferred by mutant 5-enolpyruvlshikimate-3-phosphate synthase (EPSP) and aroA genes, respectively) and other phosphono compounds such as glufosinate (phosphinothricin acetyl transferase (PAT) and *Streptomyces hygroscopicus* PAT, bar, genes), and pyridinoxy or phenoxy propionic acids and cyclohexones, as well as herbicides that inhibit the enzyme acetyl-CoA carboxylase (ACCase inhibitor-encoding genes). See, for example, U.S. Pat. No. 4,940,835 to Shah, et al., which discloses the nucleotide sequence of a form of EPSP which can confer glyphosate resistance. A DNA molecule encoding a mutant aroA gene can be obtained under ATCC accession number 39256, and the nucleotide sequence of the mutant gene is disclosed in U.S. Pat. No. 4,769,061 to Comai. European patent application No. 0 333 033 to Kumada et al., and U.S. Pat. No. 4,975,374 to Goodman et al., disclose nucleotide sequences of glutamine synthetase genes which confer resistance to herbicides such as L-phosphinothricin. The nucleotide sequence of a PAT gene is provided in European application No. 0 242 246 to Leemans et al. DeGreef et al., Bio/Technology 7:61 (1989), describe the production of transgenic plants that express chimeric bar genes coding for PAT activity. Exemplary of genes conferring resistance to phenoxy propionic acids and cyclohexones, such as sethoxydim and haloxyfop are the Acc1-S1, Acc1-S2 and Acc1-S3 genes described by Marshall et al., Theor. Appl. Genet. 83:435 (1992).

C. An herbicide that inhibits photosynthesis, such as a triazine (psbA and gs+ genes) or a benzonitrile (nitrilase gene). Przibilla et al., Plant Cell 3:169 (1991), describe the transformation of *Chlamydomonas* with plasmids encoding mutant psbA genes. Nucleotide sequences for nitrilase genes are disclosed in U.S. Pat. No. 4,810,648 to Stalker, and DNA molecules containing these genes are available under ATCC Accession Nos. 53435, 67441, and 67442. Cloning and expression of DNA coding for a glutathione S-transferase is described by Hayes et al., Biochem. J. 285:173 (1992)

D. Acetohydroxy acid synthase, which has been found to make plants that express this enzyme resistant to multiple types of herbicides, has been introduced into a variety of plants. See, Hattori, et al., Mol. Gen. Genet., 246:419 (1995). Other genes that confer tolerance to herbicides include a gene encoding a chimeric protein of rat cytochrome P4507A1 and yeast NADPH-cytochrome P450 oxidoreductase (Shiota, et al., Plant Physiol., 106:17 (1994)); genes for glutathione reductase and superoxide dismutase (Aono, et al., Plant Cell Physiol., 36:1687 (1995)); and genes for various phosphotransferases (Datta, et al., Plant Mol. Biol., 20:619 (1992)).

E. Protoporphyrinogen oxidase (protox) is necessary for the production of chlorophyll, which is necessary for all plant survival. The protox enzyme serves as the target for a variety of herbicidal compounds. These herbicides also inhibit growth of all the different species of plants present, causing their total destruction. The development of plants containing altered protox activity which are resistant to these herbicides are described in U.S. Pat. Nos. 6,288,306, 6,282,837, 5,767,373, and International Publication WO 01/12825.

Any of the above listed herbicide genes (A-E) can be introduced into a claimed reduced-fat peanut line of the present invention through a variety of means including but not limited to transformation and crossing.

3. Genes that Confer or Contribute to a Value-Added Trait, Such as:

A. Modified fatty acid metabolism, for example, by transforming a plant with an antisense gene of stearyl-ACP desaturase to increase stearic acid content of the plant. See Knultzon et al., Proc. Natl. Acad. Sci. U.S.A. 89:2624 (1992).

B. Decreased phytate content, 1) Introduction of a phytase-encoding gene would enhance breakdown of phytate, adding more free phosphate to the transformed plant. For example, see Van Hartingsveldt et al., Gene 127:87 (1993), for a disclosure of the nucleotide sequence of an *Aspergillus niger* phytase gene; 2) A gene could be introduced that reduced phytate content. In maize, this, for example, could be accomplished, by cloning and then reintroducing DNA associated with the single allele which is responsible for maize mutants characterized by low levels of phytic acid. See Raboy et al., Maydica 35:383 (1990).

C. Modified carbohydrate composition effected, for example, by transforming plants with a gene coding for an enzyme that alters the branching pattern of starch. See Shiroza et al., J. Bacteol. 170:810 (1988) (nucleotide sequence of *Streptococcus* mutants fructosyltransferase gene), Steinmetz et al., Mol. Gen. Genet. 20:220 (1985) (nucleotide sequence of *Bacillus subtilis* levansucrase gene), Pen et al., Bio/Technology 10:292 (1992) (production of transgenic plants that express *Bacillus lichenfonnis* α-amylase), Elliot et al., Plant Molec. Biol. 21:515 (1993) (nucleotide sequences of tomato invertase genes), Søgaard et al., J. Biol. Chem. 268:22480 (1993) (site-directed mutagenesis of barley α-amylase gene), and Fisher et al., *Plant Physiol.* 102:1045 (1993) (maize endosperm starch branching enzyme II).

D. Elevated oleic acid via FAD-2 gene modification and/or decreased linolenic acid via FAD-3 gene modification. See, U.S. Pat. Nos. 6,063,947, 6,323,392, and International Publication WO 93/11245. Although as many as 12 fatty acids have been reported in peanuts, only 3 are present in amounts exceeding 5%: palmitic, oleic and linoleic (Ahmed, E. M. et al in *Peanut Science and Technology* (1982 H. E. Pattec, et al., ed)). These three fatty acids comprise about 90% of the fatty acid composition of the oil, with oleic and linoleic comprising about 80%. The remainder of the fatty acids comprise about 10%, each ranging in concentration from 0.02% to 2.59%. The American Heart Association and the American Health Foundation have recommended diet modifications to achieve lower serum cholesterol levels in the population. These diet modifications include reducing consumption of saturated fatty acids and thereby increasing the polyunsaturated to saturated (P/S) ratio in the diet (Technical Committee, *Food Fats and Oils*, 5$^{th}$ ed. (1992)). Edible peanut oils with a higher percentage of unsaturated fatty acids are desired for these cardiovascular health reasons (Mattson, F. H. et al., *J Lipid Research* 26:194-202 (1985)).

E. Altering conjugated linolenic or linoleic acid content, such as in WO 01/12800. Altering LEC1, AGP, Dek1, Superal1, mi1ps, and various Ipa genes, such as Ipa1, Ipa3, hpt, or hggt. See, for example, WO 02/42424, WO 98/22604, WO 03/011015, WO 02/057439, WO 03/011015, U.S. Pat. Nos. 6,423,886, 6,197,561, 6,825,397, 7,157,621, U.S. Publ. No. 2003/0079247, and Rivera-Madrid, R., et al., *Proc. Natl. Acad. Sci.*, 92:5620-5624 (1995).

F. Altered antioxidant content or composition, such as alteration of tocopherol or tocotrienols. See, for example, U.S. Pat. Nos. 6,787,683, 7,154,029, WO 00/68393 (involving the manipulation of antioxidant levels through alteration of a phytl prenyl transferase (ppt)); WO 03/082899 (through alteration of a homogentisate geranyl geranyl transferase (hggt)).

G. Altered essential seed amino acids. See, for example, U.S. Pat. No. 6,127,600 (method of increasing accumulation of essential amino acids in seeds); U.S. Pat. No. 6,080,913 (binary methods of increasing accumulation of essential amino acids in seeds); U.S. Pat. No. 5,990,389 (high lysine); U.S. Pat. No. 5,850,016 (alteration of amino acid compositions in seeds); U.S. Pat. No. 5,885,802 (high methionine); U.S. Pat. No. 5,885,801 (high threonine); U.S. Pat. No. 6,664,445 (plant amino acid biosynthetic enzymes); U.S. Pat. No. 6,459,019 (increased lysine and threonine); U.S. Pat. No. 6,441,274 (plant tryptophan synthase beta subunit); U.S. Pat. No. 6,346,403 (methionine metabolic enzymes); U.S. Pat. No. 5,939,599 (high sulfur); U.S. Pat. No. 5,912,414 (increased methionine); U.S. Pat. No. 5,633,436 (increasing sulfur amino acid content); U.S. Pat. No. 5,559,223 (synthetic storage proteins with defined structure containing programmable levels of essential amino acids for improvement of the nutritional value of plants); U.S. Pat. No. 6,194,638 (hemicellulose); U.S. Pat. No. 7,098,381 (UDPGdH); U.S. Pat. No. 6,194,638 (RGP); U.S. Pat. Nos. 6,399,859, 6,930,225, 7,179,955, and 6,803,498; U.S. Publ. No. 2004/0068767; WO 99/40209 (alteration of amino acid compositions in seeds); WO 99/29882 (methods for altering amino acid content of proteins); WO 98/20133 (proteins with enhanced levels of essential amino acids); WO 98/56935 (plant amino acid biosynthetic enzymes); WO 98/45458 (engineered seed protein having higher percentage of essential amino acids); WO 98/42831 (increased lysine); WO 96/01905 (increased threonine); WO 95/15392 (increased lysine); WO 01/79516; and WO 00/09706 (Ces A: cellulose synthase).

4. Genes that Control Male Sterility:

There are several methods of conferring genetic male sterility available, such as multiple mutant genes at separate locations within the genome that confer male sterility, as disclosed in U.S. Pat. Nos. 4,654,465 and 4,727,219 to Brar, et al., and chromosomal translocations as described by Patterson in U.S. Pat. Nos. 3,861,709 and 3,710,511. In addition to these methods, Albertsen, et al., U.S. Pat. No. 5,432,068, describes a system of nuclear male sterility which includes: identifying a gene which is critical to male fertility; silencing this native gene which is critical to male fertility; removing the native promoter from the essential male fertility gene and replacing it with an inducible promoter; inserting this genetically engineered gene back into the plant; and thus creating a plant that is male sterile because the inducible promoter is not "on" resulting in the male fertility gene not being transcribed. Fertility is restored by inducing, or turning "on," the promoter, which in turn allows the gene that confers male fertility to be transcribed.

A. Introduction of a deacetylase gene under the control of a tapetum-specific promoter and with the application of the chemical N-Ac-PPT. See, International Publication WO 01/29237.

B. Introduction of various stamen-specific promoters. See, International Publications WO 92/13956 and WO 92/13957.

C. Introduction of the barnase and the barstar genes. See, Paul, et al., *Plant Mol. Biol.*, 19:611-622 (1992).

For additional examples of nuclear male and female sterility systems and genes, see also, U.S. Pat. Nos. 5,859,341, 6,297,426, 5,478,369, 5,824,524, 5,850,014, and 6,265,640, all of which are hereby incorporated by reference.

5. Genes that Create a Site for Site Specific DNA Integration:

This includes the introduction of FRT sites that may be used in the FLP/FRT system and/or Lox sites that may be used in the Cre/Loxp system. See, for example, Lyznik, et al., Site-Specific Recombination for Genetic Engineering in Plants, *Plant Cell Rep*, 21:925-932 (2003) and WO 99/25821, which are hereby incorporated by reference. Other systems that may be used include the Gin recombinase of phage Mu (Maeser, et al. (1991); Vicki Chandler, The Maize Handbook, Ch. 118 (Springer-Verlag 1994)); the Pin recombinase of *E. coli* (Enomoto, et al. (1983)); and the R/RS system of the pSR1 plasmid (Araki, et al. (1992)).

6. Genes that Affect Abiotic Stress Resistance:

Genes that affect abiotic stress resistance (including but not limited to flowering, pod and seed development, enhancement of nitrogen utilization efficiency, altered nitrogen responsiveness, drought resistance or tolerance, cold resistance or tolerance, and salt resistance or tolerance) and increased yield under stress. For example, see: WO 00/73475 where water use efficiency is altered through alteration of malate; U.S. Pat. Nos. 5,892,009, 5,965,705, 5,929,305, 5,891,859, 6,417,428, 6,664,446, 6,706,866, 6,717,034, 6,801,104, WO 2000/060089, WO 2001/026459, WO 2001/035725, WO 2001/034726, WO 2001/035727, WO 2001/036444, WO 2001/036597, WO 2001/036598, WO 2002/015675, WO 2002/017430, WO 2002/077185, WO 2002/079403, WO 2003/013227, WO 2003/013228, WO 2003/014327, WO 2004/031349, WO 2004/076638, WO 98/09521, and WO 99/38977 describing genes, including CBF genes and transcription factors effective in mitigating the negative effects of freezing, high salinity, and drought on plants, as well as conferring other positive effects on plant phenotype; U.S. Publ. No. 2004/0148654 and WO 01/36596, where abscisic acid is altered in plants resulting in improved plant phenotype, such as increased yield and/or increased tolerance to abiotic stress; WO 2000/006341, WO 04/090143, U.S. Pat. Nos. 7,531,723, and 6,992,237, where cytokinin expression is modified resulting in plants with increased stress tolerance, such as drought tolerance, and/or increased yield. See also, WO 02/02776, WO 2003/052063, JP 2002281975, U.S. Pat. No. 6,084,153, WO 01/64898, and U.S. Pat. Nos. 6,177,275 and 6,107,547 (enhancement of nitrogen utilization and altered nitrogen responsiveness). For ethylene alteration, see, U.S. Publ. Nos. 2004/0128719, 2003/0166197, and WO 2000/32761. For plant transcription factors or transcriptional regulators of abiotic stress, see, e.g., U.S. Publ. Nos. 2004/0098764 or 2004/0078852.

Other genes and transcription factors that affect plant growth and agronomic traits, such as yield, flowering, plant growth, and/or plant structure, can be introduced or introgressed into plants. See, e.g., WO 97/49811 (LHY), WO 98/56918 (ESD4), WO 97/10339, U.S. Pat. No. 6,573,430 (TFL), 6,713,663 (FT), 6,794,560, 6,307,126 (GAI), WO 96/14414 (CON), WO 96/38560, WO 01/21822 (VRN1), WO 00/44918 (VRN2), WO 99/49064 (GI), WO 00/46358 (FRI), WO 97/29123, WO 99/09174 (D8 and Rht), WO 2004/076638, and WO 004/031349 (transcription factors).

Methods for Transformation

Numerous methods for plant transformation have been developed, including biological and physical, plant transformation protocols. See, for example, Miki et al., "Procedures for Introducing Foreign DNA into Plants" in *Methods in Plant Molecular Biology and Biotechnology*, Glick B. R. and Thompson, J. E. Eds. (CRC Press, Inc., Boca Raton, 1993) pages 67-88. In addition, expression vectors and in vitro culture methods for plant cell or tissue transformation and regeneration of plants are available. See, for example, Gruber et al., "Vectors for Plant Transformation" in *Methods in Plant Molecular Biology and Biotechnology*, Glick B. R. and Thompson, J. E. Eds. (CRC Press, Inc., Boca Raton, 1993) pages 89-119.

A. *Agrobacterium*-mediated Transformation—One method for introducing an expression vector into plants is based on the natural transformation system of *Agrobacterium*. See, for example, Horsch et al., *Science* 227:1229 (1985). *A. tumefaciens* and *A. rhizogenes* are plant pathogenic soil bacteria which genetically transform plant cells. The Ti and Ri plasmids of *A. tumefaciens* and *A. rhizogenes*, respectively, carry genes responsible for genetic transformation of the plant. See, for example, Kado, C. I., *Crit. Rev. Plant Sci.* 10:1 (1991). Descriptions of *Agrobacterium* vector systems and methods for *Agrobacterium*-mediated gene transfer are provided by Gruber et al., supra, Miki et al., supra, and Moloney et al., *Plant Cell Reports* 8:238 (1989). See also, U.S. Pat. No. 5,591,616 issued Jan. 7, 1997.

B. Direct Gene Transfer—Despite the fact the host range for *Agrobacterium*-mediated transformation is broad, some major cereal crop species and gymnosperms have generally been recalcitrant to this mode of gene transfer, even though some success has recently been achieved in rice and corn. Hiei et al., *The Plant Journal* 6:271-282 (1994) and U.S. Pat. No. 5,591,616 issued Jan. 7, 1997. Several methods of plant transformation, collectively referred to as direct gene transfer, have been developed as an alternative to *Agrobacterium*-mediated transformation.

A generally applicable method of plant transformation is microprojectile-mediated transformation wherein DNA is carried on the surface of microprojectiles measuring 1 to 4 m. The expression vector is introduced into plant tissues with a biolistic device that accelerates the microprojectiles to speeds of 300 to 600 m/s which is sufficient to penetrate plant cell walls and membranes. Sanford et al., *Part. Sci. Technol.* 5:27 (1987), Sanford, J. C., *Trends Biotech.* 6:299 (1988), Klein et al., *Bio/Technology* 6:559-563 (1988), Sanford, J. C., *Physiol Plant* 7:206 (1990), Klein et al., *Biotechnology* 10:268 (1992). In corn, several target tissues can be bombarded with DNA-coated microprojectiles in order to produce transgenic plants, including, for example, callus (Type I or Type II), immature embryos, and meristematic tissue.

Another method for physical delivery of DNA to plants is sonication of target cells. Zhang et al., *Bio/Technology* 9:996 (1991). Additionally, liposome and spheroplast fusion have been used to introduce expression vectors into plants. Deshayes et al., *EMBO J.*, 4:2731 (1985), Christou et al., *Proc Natl. Acad. Sci. U.S.A.* 84:3962 (1987). Direct uptake of DNA into protoplasts using $CaCl_2$) precipitation, polyvinyl alcohol or poly-L-ornithine has also been reported. Hain et al., *Mol. Gen. Genet.* 199:161 (1985) and Draper et al., *Plant Cell Physiol.* 23:451 (1982). Electroporation of protoplasts and whole cells and tissues have also been described. Donn et al., In Abstracts of VIIth International Congress on Plant Cell and Tissue Culture IAPTC, A2-38, p 53 (1990); D'Halluin et al., *Plant Cell* 4:1495-1505 (1992) and Spencer et al., *Plant Mol. Biol.* 24:51-61 (1994).

Following transformation of peanut target tissues, expression of the above-described selectable marker genes allows for preferential selection of transformed cells, tissues and/or plants, using regeneration and selection methods now well known in the art.

The foregoing methods for transformation would typically be used for producing a transgenic cultivar. The transgenic cultivar could then be crossed, with another (non-transformed or transformed) cultivar, in order to produce a new transgenic cultivar. Alternatively, a genetic trait which has been engineered into a particular peanut cultivar using the foregoing transformation techniques could be moved into another cultivar using traditional backcrossing techniques that are well known in the plant breeding arts. For example, a backcrossing approach could be used to move an engineered trait from a public, non-elite cultivar into an elite cultivar, or from a cultivar containing a foreign gene in its genome into a cultivar which does not contain that gene. As used herein, "crossing" can refer to a simple X by Y cross, or the process of backcrossing, depending on the context.

Single or Multiple Gene Conversion

When the term peanut plant is used in the context of the present invention, this also includes any single or multiple gene conversions of that plant. The terms single or multiple gene converted plant as used herein refers to those peanut plants which are developed by a plant breeding technique called backcrossing wherein essentially all of the desired morphological and physiological characteristics of a cultivar are recovered in addition to the single or multiple gene(s) transferred into the cultivar via the backcrossing technique. Backcrossing methods can be used with the present invention to improve or introduce a characteristic into the cultivar. The term backcrossing as used herein refers to the repeated crossing of a hybrid progeny back to one of the parental peanut plants, the recurrent parent, for that cultivar, i.e., backcrossing 1, 2, 3, 4, 5, 6, 7, 8, 9 or more times to the recurrent parent. The parental peanut plant which contributes the gene for the desired characteristic is termed the nonrecurrent or donor parent. This terminology refers to the fact that the nonrecurrent parent is used one time in the backcross protocol and therefore does not recur. The parental peanut plant to which the gene or genes from the nonrecurrent parent are transferred is known as the recurrent parent as it is used for several rounds in the backcrossing protocol (Fehr, W. R. et al. Principles of Cultivar Development—Theory and Technique pp. 261-286 (1987) and Pohelman and Sleper (1994)).

In a typical backcross protocol, the original cultivar of interest (recurrent parent) is crossed to a second cultivar (nonrecurrent parent) that carries the single or multiple gene(s) of interest to be transferred. The resulting progeny from this cross are then crossed again to the recurrent parent and the process is repeated until a peanut plant is obtained wherein essentially all of the desired morphological and physiological characteristics of the recurrent parent are recovered in the converted plant, in addition to the single or multiple transferred gene(s) from the nonrecurrent parent as determined at the 5% significance level when grown in the same environmental conditions.

The selection of a suitable recurrent parent is an important step for a successful backcrossing procedure. The goal of a backcross protocol is to alter or substitute a single or multiple trait or characteristic in the original cultivar. To accomplish this, a single or multiple gene(s) of the recurrent cultivar is modified or substituted with the desired gene from the nonrecurrent parent, while retaining essentially all of the rest of the desired genetic, and therefore the desired physiological and morphological, constitution of the original cultivar. The choice of the particular nonrecurrent parent will depend on the purpose of the backcross; one of the major purposes is to add some commercially desirable, agronomically important trait to the plant. The exact backcrossing protocol will depend on the characteristic or trait being altered to determine an appropriate testing protocol. Although backcrossing methods are simplified when the characteristic being transferred is a dominant allele, a recessive allele may also be transferred. In this instance it may be necessary to introduce a test of the progeny to determine if the desired characteristic has been successfully transferred.

Many single or multiple gene traits have been identified that are not regularly selected for in the development of a new cultivar but that can be improved by backcrossing techniques. Single or multiple gene traits may or may not be transgenic, examples of these traits include but are not limited to, male sterility, waxy starch, herbicide resistance, resistance for bacterial, fungal, or viral disease, insect resistance, male fertility, enhanced nutritional quality, improved agronomic characteristics, industrial usage, yield stability and yield enhancement. These genes are generally inherited through the nucleus. Some known exceptions to this are the genes for male sterility, some of which are inherited cytoplasmically, but still act as single gene traits. Several of these single gene traits are described in U.S. Pat. Nos. 5,777,196; 5,948,957 and 5,969,212, the disclosures of which are specifically hereby incorporated by reference.

Additional Methods for Genetic Engineering of Peanut

In general, methods to transform, modify, edit, or alter plant endogenous genomic DNA include altering the plant native DNA sequence or a pre-existing transgenic sequence including regulatory elements, coding and non-coding sequences. These methods can be used, for example, to target nucleic acids to pre-engineered target recognition sequences in the genome. Such pre-engineered target sequences may be introduced by genome editing or modification. As an example, a genetically modified plant variety is generated using "custom" or engineered endonucleases such as meganucleases produced to modify plant genomes (see e.g., WO 2009/114321; Gao et al. (2010) Plant Journal 1:176-187). Another site-directed engineering method is through the use of zinc finger domain recognition coupled with the restriction properties of restriction enzyme. See e.g., Urnov, et al., (2010) Nat Rev Genet. 11(9):636-46; Shukla, et al., (2009) Nature 459 (7245):437-41. A transcription activator-like (TAL) effector-DNA modifying enzyme (TALE or TALEN) is also used to engineer changes in plant genome. See e.g., US20110145940, Cermak et al., (2011) Nucleic Acids Res. 39(12) and Boch et al., (2009), Science 326(5959): 1509-12. Site-specific modification of plant genomes can also be performed using the bacterial type II CRISPR (clustered regularly interspaced short palindromic repeats)/Cas (CRISPR-associated) system, as well as similar CRISPR related technologies. See e.g., Belhaj et al., (2013), Plant Methods 9: 39; The Cas9/guide RNA-based system allows targeted cleavage of genomic DNA guided by a customizable small noncoding RNA in plants (see e.g., WO 2015026883A1, incorporated herein by reference).

A genetic map can be generated that identifies the approximate chromosomal location of an integrated DNA molecule, for example via conventional restriction fragment length polymorphisms (RFLP), polymerase chain reaction (PCR) analysis, simple sequence repeats (SSR), and single nucleotide polymorphisms (SNP). For exemplary methodologies in this regard, see Glick and Thompson, Methods in Plant Molecular Biology and Biotechnology, pp. 269-284 (CRC Press, Boca Raton, 1993).

Wang et al. discuss "Large Scale Identification, Mapping and Genotyping of Single-Nucleotide Polymorphisms in the Human Genome", Science (1998) 280:1077-1082, and similar capabilities are increasingly available for the radish genome. Map information concerning chromosomal location is useful for proprietary protection of a subject transgenic plant. If unauthorized propagation is undertaken and crosses made with other germplasm, the map of the integration region can be compared to similar maps for suspect plants to determine if the latter have a common parentage with the subject plant. Map comparisons could involve hybridizations, RFLP, PCR, SSR, sequencing or combinations thereof, all of which are conventional techniques. SNPs may also be used alone or in combination with other techniques.

Tissue Culture

Further reproduction of peanut plants which produce seeds having a reduced-fat content of from about 27.9% to about 39.57% can occur by tissue culture and regeneration. Tissue culture of various tissues of peanut and regeneration of plants therefrom is well known and widely published. For example, reference may be had to Komatsuda, T. et al., Crop Sci. 31:333-337 (1991); Stephens, P. A., et al., Theor. Appl. Genet. (1991) 82:633-635; Komatsuda, T. et al., Plant Cell, Tissue and Organ Culture, 28:103-113 (1992); Dhir, S. et al., Plant Cell Reports (1992) 11:285-289; Pandey, P. et al., Japan J. Breed. 42:1-5 (1992); and Shetty, K., et al., Plant Science 81:245-251 (1992); as well as U.S. Pat. No. 5,024,944 issued Jun. 18, 1991 to Collins et al., and U.S. Pat. No. 5,008,200 issued Apr. 16, 1991 to Ranch et al. Thus, another aspect of this invention is to provide cells which upon growth and differentiation produce peanut plants having the physiological and morphological characteristics of peanut plants which produce seeds having a reduced-fat content of from about 27.9% to about 39.57%.

As used herein, the term "tissue culture" indicates a composition comprising isolated cells of the same or a different type or a collection of such cells organized into parts of a plant. Exemplary types of tissue cultures are protoplasts, calli, plant clumps, and plant cells that can generate tissue culture that are intact in plants or parts of plants, such as embryos, pollen, flowers, seeds, pods, leaves, stems, roots, root tips, anthers, and the like. Means for preparing and maintaining plant tissue culture are well known in the art. By way of example, a tissue culture comprising organs has been used to produce regenerated plants. U.S. Pat. Nos. 5,959,185; 5,973,234 and 5,977,445 describe certain techniques, the disclosures of which are incorporated herein by reference.

As used herein, the term "plant" includes plant cells, plant protoplasts, plant cells of tissue culture from which peanut plants can be regenerated, plant calli, plant clumps, and plant cells that are intact in plants or parts of plants, such as pollen, flowers, embryos, ovules, seeds, pods, leaves, stems, pistils, anthers and the like.

Duncan, et al., Planta 165:322-332 (1985) reflects that 97% of the plants cultured that produced callus were capable of plant regeneration. Subsequent experiments with both cultivars and hybrids produced 91% regenerable callus that produced plants. In a further study in 1988, Songstad, et al., Plant Cell Reports 7:262-265 (1988), reports several media additions that enhance regenerability of callus of two cultivars. Other published reports also indicated that "non-traditional" tissues are capable of producing somatic embryogenesis and plant regeneration. K. P. Rao et al., Maize Genetics Cooperation Newsletter, 60:64-65 (1986), refers to somatic embryogenesis from glume callus cultures and B. V. Conger, et al., Plant Cell Reports, 6:345-347 (1987) indicates somatic embryogenesis from the tissue cultures of corn leaf segments. Thus, it is clear from the literature that the state of the art is such that these methods of obtaining plants are routinely used and have a very high rate of success.

Additional Breeding Methods

There are numerous steps in the development of any novel, desirable plant germplasm. Plant breeding begins with the analysis and definition of problems and weaknesses of the current germplasm, the establishment of program goals, and the definition of specific breeding objectives. The next step is selection of germplasm that possess the traits to meet the program goals. The goal is to combine in a single variety an improved combination of desirable traits from the parental germplasm. These important traits may include higher seed yield, resistance to diseases and insects, better stems and roots, resistance to low temperatures, resistance to herbicides, and better agronomic characteristics on grain quality.

Choice of breeding or selection methods depends on the mode of plant reproduction, the heritability of the trait(s) being improved, and the type of cultivar used commercially (e.g., F1 hybrid cultivar, pureline cultivar, etc.). For highly heritable traits, a choice of superior individual plants evaluated at a single location will be effective, whereas for traits with low heritability, selection should be based on mean values obtained from replicated evaluations of families of related plants. Popular selection methods commonly include pedigree selection, modified pedigree selection, mass selection, and recurrent selection, or a combination of these methods.

The complexity of inheritance influences choice of the breeding method. Backcross breeding is used to transfer one or a few favorable genes for a highly heritable trait into a desirable cultivar. This approach has been used extensively for breeding disease-resistant cultivars. Various recurrent selection techniques are used to improve quantitatively inherited traits controlled by numerous genes. The use of recurrent selection in self-pollinating crops depends on the ease of pollination, the frequency of successful hybrids from each pollination, and the number of hybrid offspring from each successful cross.

Each breeding program should include a periodic, objective evaluation of the efficiency of the breeding procedure. Evaluation criteria vary depending on the goal and objectives, but should include gain from selection per year based on comparisons to an appropriate standard, overall value of the advanced breeding lines, and number of successful cultivars produced per unit of input (e.g., per year, per dollar expended, etc.).

Promising advanced breeding lines are thoroughly tested and compared to appropriate standards in environments representative of the commercial target area(s) for three or more years. The best lines are candidates for new commercial cultivars; those still deficient in a few traits may be used as parents to produce new populations for further selection.

These processes, which lead to the final step of marketing and distribution, usually take from 8 to 12 years from the time the first cross is made and may rely on the development of improved breeding lines as precursors. Therefore, development of new cultivars is a time-consuming process that requires precise forward planning, efficient use of resources, and a minimum of changes in direction.

A most difficult task is the identification of individuals that are genetically superior, because for most traits the true genotypic value is masked by other confounding plant traits or environmental factors. One method of identifying a superior plant is to observe its performance relative to other experimental plants and to a widely grown standard cultivar. If a single observation is inconclusive, replicated observations provide a better estimate of its genetic worth.

The goal of peanut plant breeding is to develop new, unique and superior peanut cultivars and hybrids. The breeder initially selects and crosses two or more parental lines, followed by self-pollination and selection, producing many new genetic combinations. The breeder can theoretically generate billions of different genetic combinations via crossing, selfing and mutations. The breeder has no direct control at the cellular level. Therefore, two breeders will never develop the same line, or even very similar lines, having the same peanut traits.

Each year, the plant breeder selects the germplasm to advance to the next generation. This germplasm is grown under unique and different geographical, climatic and soil conditions, and further selections are then made, during and at the end of the growing season. The cultivars which are developed are unpredictable. This unpredictability is because the breeder's selection occurs in unique environments, with no control at the DNA level (using conventional breeding procedures), and with millions of different possible genetic combinations being generated. A breeder of ordinary skill in the art cannot predict the final resulting lines he develops, except possibly in a very gross and general fashion. The same breeder cannot produce the same cultivar twice by using the exact same original parents and the same selection techniques. This unpredictability results in the expenditure of large amounts of research monies to develop superior new peanut cultivars.

The development of new peanut cultivars requires the development and selection of peanut varieties, the crossing of these varieties and selection of superior hybrid crosses.

The hybrid seed is produced by manual crosses between selected male-fertile parents or by using male sterility systems. These hybrids are selected for certain single gene traits such as semi-dwarf plant type, pubescence, awns, and apiculus color which indicate that the seed is truly a hybrid. Additional data on parental lines, as well as the phenotype of the hybrid, influence the breeder's decision whether to continue with the specific hybrid cross.

Pedigree breeding and recurrent selection breeding methods are used to develop cultivars from breeding populations. Breeding programs combine desirable traits from two or more cultivars or various broad-based sources into breeding pools from which cultivars are developed by selfing and selection of desired phenotypes. The new cultivars are evaluated to determine which have commercial potential.

Pedigree breeding is used commonly for the improvement of self-pollinating crops. Two parents which possess favorable, complementary traits are crossed to produce an $F_1$. An $F_2$ population is produced by selfing one or several $F_1$'s. Selection of the best individuals may begin in the $F_2$ population; then, beginning in the $F_3$, the best individuals in the best families are selected. Replicated testing of families can begin in the $F_4$ generation to improve the effectiveness of selection for traits with low heritability. At an advanced stage of inbreeding (i.e., $F_6$ and $F_7$), the best lines or mixtures of phenotypically similar lines are tested for potential release as new cultivars.

Mass and recurrent selections can be used to improve populations of either self- or cross-pollinating crops. A genetically variable population of heterozygous individuals is either identified or created by intercrossing several different parents. The best plants are selected based on individual superiority, outstanding progeny, or excellent combining ability. The selected plants are intercrossed to produce a new population in which further cycles of selection are continued.

Backcross breeding has been used to transfer genes for a simply inherited, highly heritable trait into a desirable homozygous cultivar or inbred line which is the recurrent parent. The source of the trait to be transferred is called the donor parent. The resulting plant is expected to have the attributes of the recurrent parent (e.g., cultivar) and the desirable trait transferred from the donor parent. After the initial cross, individuals possessing the phenotype of the donor parent are selected and repeatedly crossed (backcrossed) to the recurrent parent. The resulting plant is expected to have the attributes of the recurrent parent (e.g., cultivar) and the desirable trait transferred from the donor parent.

The single-seed descent procedure in the strict sense refers to planting a segregating population, harvesting a sample of one seed per plant, and using the one-seed sample to plant the next generation. When the population has been advanced from the $F_2$ to the desired level of inbreeding, the plants from which lines are derived will each trace to different $F_2$ individuals. The number of plants in a population declines each generation due to failure of some seeds to germinate or some plants to produce at least one seed. As a result, not all of the $F_2$ plants originally sampled in the population will be represented by a progeny when generation advance is completed.

In a multiple-seed procedure, peanut breeders commonly harvest one or more seeds from each plant in a population and thresh them together to form a bulk. Part of the bulk is used to plant the next generation and part is put in reserve. The procedure has been referred to as modified single-seed descent or the pod-bulk technique.

The multiple-seed procedure has been used to save labor at harvest. It is considerably faster to thresh panicles with a machine than to remove one seed from each by hand for the single-seed procedure. The multiple-seed procedure also makes it possible to plant the same number of seeds of a population each generation of inbreeding. Enough seeds are harvested to make up for those plants that did not germinate or produce seed.

Mutation breeding is another method of introducing new traits into peanut lines. Mutations that occur spontaneously or are artificially induced can be useful sources of variability for a plant breeder. The goal of artificial mutagenesis is to increase the rate of mutation for a desired characteristic. Mutation rates can be increased by many different means including temperature, long-term seed storage, tissue culture conditions, radiation (such as X-rays, Gamma rays, neutrons, Beta radiation, or ultraviolet radiation), chemical mutagens (such as base analogs like 5-bromo-uracil), alkylating agents (such as sulfur mustards, nitrogen mustards, epoxides, ethyleneamines, sulfates, sulfonates, sulfones, or lactones), azide, hydroxylamine, nitrous acid or acridines. Once a desired phenotype is observed the genetic mutation responsible for that trait may then be incorporated into existing germplasm by traditional breeding techniques. The use of mutagenic agents to create genetic diversity in peanuts as well as useful peanut mutants has been described by Norden, A. J., et al., Breeding of the cultivated peanut in Peanut Science and Technology, the entirety of which is incorporated herein by reference. Peanut mutants may be induced by γ-irradiation according to the method of Sharma, et al. *Qual. Plant Foods Hum. Nutr.* 35:3-8 (1985), the entirety of which is incorporated herein by reference. Methods for inducing mutation in peanut seeds chemically are also available in Ashri, A. Mutation Research, 9:473-480 (1970). Details of mutation breeding can be found in Principles of Cultivar Development by Fehr, Macmillan Publishing Company, 1993.

The production of double haploids can also be used for the development of homozygous varieties in a breeding program. Double haploids are produced by doubling a set of chromosomes from a heterozygous plant to produce a completely homozygous individual. For example, see Wan et al., *Theor. Appl. Genet.,* 77:889-892, 1989.

Descriptions of other breeding methods that are commonly used for different traits and crops can be found in several reference books (e.g., *Principles of Plant Breeding* John Wiley and Son, pp. 115-161, 1960; Allard, 1960; Simmonds, 1979; Sneep et al., 1979; Fehr, 1987; Carrots and Related Vegetable Umbelliferae, Rubatzky, V. E., et al., 1999).

Genetic Analysis

In addition to phenotypic observations, the genotype of a plant can also be examined. There are many laboratory-based techniques available for the analysis, comparison and characterization of plant genotype; among these are Isozyme Electrophoresis, Restriction Fragment Length Polymorphisms (RFLPs), Randomly Amplified Polymorphic DNAs (RAPDs), Arbitrarily Primed Polymerase Chain Reaction (AP-PCR), DNA Amplification Fingerprinting (DAF), Sequence Characterized Amplified Regions (SCARs), Amplified Fragment Length polymorphisms (AFLPs), Simple Sequence Repeats (SSRs—which are also referred to as Microsatellites), and Single Nucleotide Polymorphisms (SNPs).

Isozyme Electrophoresis and RFLPs have been widely used to determine genetic composition. Shoemaker and Olsen (Molecular Linkage Map of Soybean (*Glycine max*), pp. 6.131-6.138 in S. J. O'Brien (ed.) *Genetic Maps: Locus Maps of Complex Genomes*, Cold Spring Harbor Laboratory Press, Cold Spring Harbor, NY (1993)) developed a molecular genetic linkage map that consisted of 25 linkage groups with about 365 RFLP, 11 RAPD, three classical markers, and four isozyme loci. See also, Shoemaker, R. C., RFLP Map of Soybean, pp. 299-309, in Phillips, R. L. and Vasil, I. K. (eds.), *DNA-Based Markers in Plants*, Kluwer Academic Press, Dordrecht, the Netherlands (1994).

The invention further provides a method of determining the genotype of a peanut plant which produces seeds having a reduced-fat content of from about 27.9% to about 39.57%, or a first generation progeny thereof, which may comprise obtaining a sample of nucleic acids from said plant and detecting in said nucleic acids a plurality of polymorphisms. This method may additionally comprise the step of storing the results of detecting the plurality of polymorphisms on a computer readable medium. The plurality of polymorphisms are indicative of and/or give rise to the expression of the morphological and physiological characteristics of a peanut plant which produces seeds having a reduced-fat content of from about 27.9% to about 39.57%.

With any of the genotyping techniques mentioned herein, polymorphisms may be detected when the genotype and/or sequence of the plant of interest is compared to the genotype and/or sequence of one or more reference plants. The polymorphism revealed by these techniques may be used to establish links between genotype and phenotype. The polymorphisms may thus be used to predict or identify certain phenotypic characteristics, individuals, or even species. The polymorphisms are generally called markers. It is common practice for the skilled artisan to apply molecular DNA techniques for generating polymorphisms and creating markers. The polymorphisms of this invention may be provided in a variety of mediums to facilitate use, e.g. a database or computer readable medium, which may also contain descriptive annotations in a form that allows a skilled artisan to examine or query the polymorphisms and obtain useful information.

SSR technology is currently the most efficient and practical marker technology; more marker loci can be routinely used and more alleles per marker locus can be found using SSRs in comparison to RFLPs. For example, Diwan and Cregan described a highly polymorphic microsatellite locus in soybean with as many as 26 alleles. (Diwan, N. and Cregan, P. B., *Theor. Appl. Genet.* 95:22-225, 1997.) Single Nucleotide Polymorphisms (SNPs) may also be used to identify the unique genetic composition of the invention and progeny varieties retaining that unique genetic composition. Various molecular marker techniques may be used in combination to enhance overall resolution.

Molecular markers, which include markers identified through the use of techniques such as Isozyme Electrophoresis, RFLPs, RAPDs, AP-PCR, DAF, SCARs, AFLPs, SSRs, and SNPs, may be used in plant breeding. One use of molecular markers is Quantitative Trait Loci (QTL) mapping. QTL mapping is the use of markers which are known to be closely linked to alleles that have measurable effects on a quantitative trait. Selection in the breeding process is based upon the accumulation of markers linked to the positive effecting alleles and/or the elimination of the markers linked to the negative effecting alleles from the plant's genome.

Molecular markers can also be used during the breeding process for the selection of qualitative traits. For example, markers closely linked to alleles or markers containing sequences within the actual alleles of interest can be used to select plants that contain the alleles of interest during a backcrossing breeding program. The markers can also be used to select toward the genome of the recurrent parent and against the markers of the donor parent. This procedure attempts to minimize the amount of genome from the donor parent that remains in the selected plants. It can also be used to reduce the number of crosses back to the recurrent parent needed in a backcrossing program. The use of molecular markers in the selection process is often called genetic marker enhanced selection or marker-assisted selection. Flanking markers that are tightly linked to target genes can be used for selection and are sometimes more efficient than direct selection for the target genes. Use of flanking markers on either side of the locus of interest during marker assisted selection increases the probability that the desired gene is selected. Molecular markers may also be used to identify and exclude certain sources of germplasm as parental varieties or ancestors of a plant by providing a means of tracking genetic profiles through crosses.

Particular markers used for these purposes are not limited to the set of markers disclosed herein, but may include any type of marker and marker profile which provides a means of distinguishing varieties. In addition to being used for identification of peanut plants which produce seeds having a reduced-fat content of from about 27.9% to about 39.57%, a hybrid produced through the use of peanut plants which produce seeds having a reduced-fat content of from about 27.9% to about 39.57%, and the identification or verification of pedigree for progeny plants produced through the use of peanut plants which produce seeds having a reduced-fat content of from about 27.9% to about 39.57%, a genetic marker profile is also useful in developing a locus conversion of peanut plants which produce seeds having a reduced-fat content of from about 27.9% to about 39.57%.

Means of performing genetic marker profiles using SNP and SSR polymorphisms are well known in the art. SNPs are genetic markers based on a polymorphism in a single nucleotide. A marker system based on SNPs can be highly informative in linkage analysis relative to other marker systems in that multiple alleles may be present.

Proper testing should detect any major faults and establish the level of superiority or improvement over current cultivars. In addition to showing superior performance, there must be a demand for a new cultivar that is compatible with industry standards or which creates a new market. The introduction of a new cultivar will incur additional costs to the seed producer, the grower, processor and consumer; for special advertising and marketing, altered seed and commercial production practices, and new product utilization. The testing preceding release of a new cultivar should take into consideration research and development costs as well as technical superiority of the final cultivar. For seed-propagated cultivars, it must be feasible to produce seed easily and economically.

Peanut varieties which produce seeds having a reduced-fat content of from about 27.9% to about 39.57% of the present invention can also be used for transformation where exogenous genes are introduced and expressed by the variety. Genetic variants created either through traditional breeding methods using a line which produces seeds having a reduced-fat content of from about 27.9% to about 39.57% or through transformation of a line which produces seeds having a reduced-fat content of from about 27.9% to about 39.57% by any of a number of protocols known to those of skill in the art are intended to be within the scope of this invention.

The following describes breeding methods that may be used with a peanut plant which produces seeds having a reduced-fat content of from about 27.9% to about 39.57% in the development of further peanut plants. One such embodiment is a method for developing a progeny peanut plant in a peanut plant breeding program comprising: obtaining a peanut plant, or a part thereof, which produces seeds having a reduced-fat content of from about 27.9% to about 39.57%, utilizing said plant or plant part as a source of breeding material and selecting a progeny plant which produces seeds having a reduced-fat content of from about 27.9% to about 39.57% with molecular markers in common with peanut plants which produce seeds having a reduced-fat content of from about 27.9% to about 39.57%. Breeding steps that may be used in the peanut plant breeding program include pedigree breeding, back crossing, mutation breeding, and recurrent selection. In conjunction with these steps, techniques such as RFLP-enhanced selection, genetic marker enhanced selection (for example SSR markers) and the making of double haploids may be utilized. Double haploids are produced by the doubling of a set of chromosomes (1 N) from a heterozygous plant to produce a completely homozygous individual. For example, see Wan et al., "Efficient Production of Doubled Haploid Plants Through Colchicine Treatment of Anther-Derived Maize Callus", Theoretical and Applied Genetics, 77:889-892, 1989 and U.S. Pat. No. 7,135,615.

One of ordinary skill in the art of plant breeding would know how to evaluate the traits of two plant varieties to determine if there is no significant difference between the two traits expressed by those varieties. For example, see Fehr and Walt, Principles of Cultivar Development, p 261-286 (1987). Thus the invention includes peanut plant which produces seeds having a reduced-fat content of from about 27.9% to about 39.57% progeny peanut plants so that said progeny peanut plants are not significantly different for said traits than peanut plant which produces seeds having a reduced-fat content of from about 27.9% to about 39.57% as determined at the 5% significance level when grown in the same environment. Using techniques described herein, molecular markers may be used to identify said progeny plant as a plant which produces seeds having a reduced-fat content of from about 27.9% to about 39.57% progeny plant. Mean trait values may be used to determine whether trait differences are significant, and preferably the traits are measured on plants grown under the same environmental conditions. Once such a variety is developed its value is substantial since it is important to advance the germplasm base as a whole in order to maintain or improve traits such as yield, disease resistance, pest resistance, and plant performance in extreme environmental conditions.

Progeny of peanut plants which produce seeds having a reduced-fat content of from about 27.9% to about 39.57% may also be characterized through their filial relationship with peanut plants which produce seeds having a reduced-fat content of from about 27.9% to about 39.57%, as for example, being within a certain number of breeding crosses of peanut plants which produce seeds having a reduced-fat content of from about 27.9% to about 39.57%. A breeding cross is a cross made to introduce new genetics into the progeny, and is distinguished from a cross, such as a self or a sib cross, made to select among existing genetic alleles. The lower the number of breeding crosses in the pedigree, the closer the relationship between peanut plants which produce seeds having a reduced-fat content of from about 27.9% to about 39.57% and its progeny. For example, progeny produced by the methods described herein may be within 1, 2, 3, 4 or 5 or more breeding crosses of peanut plants which produce seeds having a reduced-fat content of from about 27.9% to about 39.57%.

INDUSTRIAL USES

Peanuts in the runner-type market class are the most commonly used varieties and are found in diverse products such as peanut butter, salted nuts and confectionery products. On the other hand, peanut varieties in the Virginia market class are largely used as salted nuts and in-shell market. The Valencia is largely used in peanut butter while the Spanish type is used in certain niche markets where small round peanuts are needed such as confectionery products and red skin peanuts. Finally, the Peruvian runner market class is grown in certain regions of Mexico.

Peanut is recognized as one of the major oilseed crops and as a rich source of protein. In the United States peanuts are primarily utilized as whole seeds for human foods and commodity plant products such as peanut butter, roasted seeds, and confections. In recent years the United States has been the leading exporter of peanuts for human consumption; peanuts rank ninth in area among the row crops and second in dollar value per acre. Peanuts are rich in nutrients, providing over 30 essential nutrients and phytonutrients, and are a good source of niacin, folate, fiber, magnesium, vitamin E, manganese and phosphorus. They are also naturally free of trans-fats and sodium, and contain about 25% protein. Because of these qualities, organizations like the World Heath Organization, UNICEF, Project Peanut Butter and Doctors Without Borders have used peanut products to help save malnourished children in developing countries. Thus, improvement of the factors that indicate and/or affect both the food quality of peanuts and the peanut harvest is of considerable importance to the worldwide peanut processing and manufacturing community.

The seed of peanut plants which produce seeds having a reduced-fat content of from about 27.9% to about 39.57%, the plant produced from the seed, the hybrid peanut plant produced from the crossing of the cultivar, hybrid seed, and various parts of the hybrid peanut plant and transgenic versions of the foregoing, can be utilized for human food, livestock feed, and as a raw material in industry.

EXAMPLES

The following examples and tables are provided to further illustrate the present invention and are not intended to limit the invention beyond the limitations set forth in the appended claims.

Example 1—Development of Reduced-Fat Peanut Products and Plant Lines

Efforts were initiated in 2012 to begin mutation breeding of peanut germplasm using chemical mutagenesis to create new genetic variation. Two commercial peanut cultivars, 'ACI 236' (U.S. PVP 201400315) and 'ACI 789' (U.S. PVP 201400321), were mutated with a diethyl sulfate (DES) solution to produce 11 separate mutant populations. These populations were subsequently planted in the field for self-pollination and subsequent seed increase in 2012. All viable M1 plants that produced seed, were bulk-harvested within each respective population for propagation in 2013. This same procedure continued through the end of the 2014 crop year (M3 generation).

In 2015, six mutant populations evaluated in the field and were selected for a number of different desirable characteristics; this group of mutant populations (and subsequent plant selections) were designated as "MU1." The other five populations were treated in a similar fashion but were selected for different characteristics; this group of mutant populations (and subsequent plant selections) were subsequently designated as "MU2." Approximately 223 individual MU1 plants and 252 individual MU2 plants were selected, hand-harvested, and replanted in 2016, per the common procedure for pedigree plant breeding. This process was repeated in 2016 for both groups, resulting in approximately 538 MU1 plant selections and 184 MU2 plant selections for subsequent propagation.

In 2017, all selected MU1 and MU2 plants from 2016 were planted and selected only for desirable agronomic characteristics (i.e. vegetative architecture, pod and seed shape and size, harvest maturity, etc.). In addition to individual plant selections, populations that exhibited sufficient uniformity for the aforementioned characteristics were selected as uniform lines and bulk-harvested for replicated yield evaluation in 2018. Approximately 17 MU1 lines and seven MU2 lines were selected and bulk-harvested; 519 individual MU1 plants and 173 individual MU2 plants were selected. This procedure was repeated in 2018-2020 and is ongoing at present.

The uniform lines selected in 2017 were planted in replicated, small-plot yield trials in 2018. The trials were arranged in a Randomized Complete Block Design, with four blocks. Agronomic data were collected for each line and subsequently analyzed. This procedure was repeated for the same mutant lines in 2019, to ensure at least two site-year locations of data.

Example 2—Development of Reduced-Fat Peanut Cultivar IPG 2309

In 2018, additional phenotypic analyses on the mutant lines selected from the 2017 nursery were conducted to evaluate various nutritional characteristics of the peanut kernels. Using a novel assay for fat content, one mutant peanut line, designated 17-MU2-2309, was identified that surprisingly and unexpectedly exhibited reduced-fat content in the kernel, compared with the U.S. Department of Agriculture standards for raw peanut kernels. This line was re-evaluated at the field level in 2019 and confirmed to be reduced-fat. All available seed of 17-MU2-2309 was subsequently replanted in 2020 to begin preliminary commercial seed increase of the line. In the name 17-MU2-2309, "17" denotes that line was selected as a uniform line in 2017, "MU2" denotes that the line was selected from the MU2 mutant populations, and "2309" denotes the plot number in 2017 that was bulk-harvested as a uniform line. Its cultivar name is now "IPG 2309."

Example 3—Pressed Kernel Oil and Total Kernel Fat Concentration of Reduced-Fat Peanut Cultivar IPG 2309

Table 2 shows the pressed kernel oil and total kernel fat concentration of mutant peanut cultivar IPG 2309, its respective non-mutant progenitor peanut ACI 789, and three runner-type cultivars ACI 236, Georgia-09B, and TUFRunner 297, in Terry and Yoakum Counties, Texas in 2018-2020. In Table 2, means within a column followed by the same lowercase letter are not significantly different according to Fisher's Least Significant Difference Test at P=0.05. "$H^2$" indicated the broad-sense heritability of the corresponding parameter.

TABLE 2

| Entry | Type | Total Oil | Total Fat |
|---|---|---|---|
| | | ----%---- | |
| IPG 2309 | Mutant | 28.1 b | 31.6 b |
| ACI 236 | Cultivar | 39.9 a | 45.6 a |
| ACI 789 | Progenitor | 39.2 a | 44.6 a |
| Georgia-09B | Cultivar | 39.2 a | 44.4 a |
| TUFRunner 297 | Cultivar | 38.0 a | 43.4 a |
| $LSD_{0.05}$ | — | 2.8 | 2.7 |
| $H^2$ | — | 94 | 93 |

As shown in Table 2, peanut cultivar IPG 2309 contains significantly less oil and fat than all of the comparison varieties.

Table 3 shows the total fat and oil concentrations of ten germplasm accessions from the U.S. peanut mini-core collection and reduced-fat mutant peanut line IPG 2309 grown under field conditions in Yoakum County, Texas in 2018. The published total fat data is from information published by Dean, L. L. et al., *Peanut Science* 36:104-120 (2009).

TABLE 3

| Entry | Fat Content Group | Published Total Fat | Total Fat | Total Oil |
|---|---|---|---|---|
| | | | ----%---- | |
| PI 399581 | Highest | 47.85 | 46.91 | 38.61 |
| PI 371521 | Highest | 47.82 | 48.12 | 42.47 |
| PI 274193 | Highest | 47.81 | 50.89 | 42.37 |
| PI 497318 | Highest | 47.77 | 49.85 | 41.94 |
| PI 268996 | Highest | 47.00 | 48.16 | 39.56 |
| PI 262038 | Lowest | 41.15 | 45.07 | 36.85 |
| PI 493329 | Lowest | 41.11 | 46.25 | 39.31 |
| PI 476025 | Lowest | 40.79 | 47.56 | 45.01 |
| PI 475863 | Lowest | 40.60 | 47.81 | 39.89 |
| PI 502120 | Lowest | 40.24 | 47.03 | 39.25 |
| IPG 2309 | — | — | 39.57 | 35.73 |

As shown in Table 3, mutant peanut cultivar IPG 2309 contains less oil and less fat than all ten of the standard peanut germplasm accessions from the U.S. peanut mini-core.

Table 4 shows the total fat and total oil concentrations of ten germplasm accessions from the U.S. peanut mini-core collection with total fat as measured by near-infrared reflectance analysis (NIRA) (American Oil Chemists Society (AOCS) method AM 1a-09) and thirteen advanced mutant peanut lines with total fat measured by acid hydrolysis (Association of Official Analytical Chemists (AOAC) method 945.44 when grown under field conditions in Yoakum County, Texas in 2019. The total oil content was measured by pressing the peanut kernels with a heated Carver hydraulic press (10,000 PSI at 150 degrees F. for 30 seconds) to express oil; samples were weighed before and after pressing to gravimetrically determine the percentage of oil in the sample.

TABLE 4

| Entry | Fat Content Group | Published Total Fat | Total Fat | Total Oil |
|---|---|---|---|---|
| | | | ----%---- | |
| PI 478819 | Highest | 45.28 | 47.70 | 40.98 |
| PI 274193 | Highest | 47.81 | 47.20 | 41.34 |
| PI 290536 | Highest | 46.73 | 45.90 | 40.99 |
| PI 200441 | Highest | 44.94 | 45.10 | 40.48 |
| PI 497517 | Lowest | 41.91 | 44.50 | 31.20 |

TABLE 4-continued

| Entry | Fat Content Group | Published Total Fat | Total Fat | Total Oil |
|---|---|---|---|---|
| PI 325943 | Highest | 43.24 | 43.70 | 40.72 |
| PI 343384 | Lowest | 43.11 | 43.60 | 32.31 |
| PI 493880 | Lowest | 41.59 | 43.50 | 32.38 |
| PI 471952 | Lowest | 42.05 | 43.50 | 31.26 |
| PI 268755 | Lowest | 45.06 | 43.30 | 31.75 |
| IPG 2309 | Mutant | — | 27.94 | 29.25 |
| 19-MU2-2004 | Mutant | — | 31.09 | 31.97 |
| 19-MU1-0116 | Mutant | — | 30.44 | 33.27 |
| 19-MU1-0223 | Mutant | — | 30.34 | 34.80 |
| 19-MU1-0618 | Mutant | — | 29.42 | 30.06 |
| 19-MU1-1022 | Mutant | — | 29.08 | 31.18 |
| 19-MU1-0819 | Mutant | — | 28.25 | 34.69 |
| 19-MU1-0516 | Mutant | — | 26.91 | 29.30 |
| 19-MU1-1322 | Mutant | — | 25.60 | 31.27 |
| 19-MU1-1118 | Mutant | — | 24.88 | 31.93 |
| 19-MU1-0312 | Mutant | — | 20.91 | 32.93 |

As shown in Table 4, thirteen advanced mutant peanut lines contain significantly less fat than all ten of the standard peanut germplasm accessions from the U.S. peanut mini-core.

Table 5 shows the total oil and total fat concentrations of eight advanced runner-type lines and fifteen advanced mutant peanut lines, identified as possible "reduced-oil" and "reduced-fat" genotypes, grown under field conditions in Terry and Yoakum Counties, Texas in 2019-2020.

TABLE 5

| Entry | Total Oil | Total Fat |
|---|---|---|
| | ---------------% --------------- | |
| 19-MU1-0516 | 29.30 | 26.91 |
| 17-1-0714 | 29.81 | 38.80 |
| 19-MU1-0618 | 30.06 | 29.42 |
| 19-MU1-1022 | 31.18 | 29.08 |
| 19-MU1-1322 | 31.27 | 25.60 |
| IPG 2309 | 29.25 | 27.94 |
| 19-MU1-1118 | 31.93 | 24.88 |
| 19-MU2-2004 | 31.97 | 31.09 |
| 18-MU1-0905 | 32.43 | 36.10 |
| 19-MU1-0312 | 32.93 | 20.91 |
| 19-MU1-0116 | 33.27 | 30.44 |
| 17-2-0108 | 33.35 | 35.88 |
| 17-2-0107 | 33.57 | 34.69 |
| 16-2-1733 | 33.57 | 37.88 |
| 18-2-0110 | 33.99 | 37.77 |
| 19-MU1-0819 | 34.69 | 28.25 |
| 19-MU1-0223 | 34.80 | 30.34 |
| 17-4-0506 | 35.00 | 37.61 |
| 18-1-0909 | 35.55 | 41.88 |
| 18-1-0206 | 35.57 | 35.53 |
| 18-MU1-2109 | 36.92 | 45.05 |

As shown in Table 5, mutant peanut cultivar IPG 2309 contains less oil and less fat than all other lines tested.

Example 4—Field Pod Yield, Commercial Grade, and Seed Size Distribution of Reduced-Fat Peanut Cultivar IPG 2309, Fifteen Advanced Mutant Peanut Lines and Four Runner-Type Cultivars Table 6 shows the field pod yield and commercial grade and seed size distribution results for mutant peanut cultivar IPG 2309, its non-mutant progenitor ACI 789, and three runner-type cultivars in Terry and Yoakum Counties, Texas in 2018-2020. Table 7 shows the field pod yield and commercial grade and seed size distribution results for fifteen advanced mutant peanut lines and four runner-type cultivars in Terry County, Texas in 2020. In Tables 6 and 7, pod yield is in kilograms per hectare (kg/ha) and was standardized at 7% moisture, TSMK indicates total sound mature kernels, Jumbo indicates whole peanut kernels that did not pass through a 8.3 mm×19.0 mm screen, Medium indicates whole peanut kernels that did not pass through a 7.1 mm×19.0 mm screen, and No. 1 indicates whole peanut kernels that did not pass through a 5.9 mm×19.0 mm screen. Means within a column followed by the same lowercase letter are not significantly different according to Fisher's Least Significant Difference Test at P=0.05.

TABLE 6

| Entry | Type | Pod Yield kg/ha | TSMK | Jumbo % | Medium | No. 1 |
|---|---|---|---|---|---|---|
| IPG 2309 | Mutant | 3586 a | 67 ab | 28 bc | 45 a | 16 a |
| ACI 789 | Progenitor | 3180 ab | 66 b | 34 ab | 36 b | 11 b |
| Georgia-09B | Cultivar | 3122 a-c | 68 ab | 19 cd | 46 a | 13 ab |
| ACI 236 | Cultivar | 2719 bc | 69 ab | 9 d | 46 a | 17 a |
| TUFRunner 297 | Cultivar | 2528 c | 71 ab | 41 a | 36 b | 9 b |
| LSD$_{0.05}$ | — | 598 | 5 | 12 | 8 | 4 |

TABLE 7

| Entry | Type | Pod Yield kg/ha | TSMK | Jumbo % | Medium | No. 1 |
|---|---|---|---|---|---|---|
| 19-MU1-0418 | Mutant | 3983 a | 71 a | 43 c | 43 d-f | 5 f |
| 19-MU1-1322 | Mutant | 3589 ab | 56 f | 8 f | 44 c-e | 28 bc |
| 19-MU1-1022 | Mutant | 3559 ab | 56 f | 5 f | 53 ab | 23 cd |
| 19-MU1-0618 | Mutant | 3519 ab | 51 gh | 4 f | 42 d-f | 32 ab |
| 19-MU1-1118 | Mutant | 3467 ab | 71 a | 53 b | 33 g | 6 f |
| Georgia-09B | Cultivar | 3255 bc | 67 bc | 8 f | 57 a | 18 de |
| 19-MU1-1405 | Mutant | 3235 b-d | 60 e | 5 f | 57 a | 20 de |
| 19-MU2-2004 | Mutant | 3170 b-e | 63 de | 61 a | 21 h | 6 f |
| 19-MU1-0819 | Mutant | 3153 b-f | 49 hi | 5 f | 35 fg | 37 a |
| 19-MU1-0312 | Mutant | 3073 b-f | 60 e | 5 f | 54 ab | 18 de |

TABLE 7-continued

| Entry | Type | Pod Yield kg/ha | TSMK | Jumbo % | Medium | No. 1 |
|---|---|---|---|---|---|---|
| 19-MU1-0223 | Mutant | 2851 c-f | 63 de | 17 e | 51 a-c | 15 e |
| ACI 789 | Cultivar | 2729 c-g | 64 cd | 21 de | 46 b-d | 15 e |
| 19-MU1-1208 | Mutant | 2719 d-g | 52 g | 3 f | 37 e-g | 30 bc |
| ACI 236 | Cultivar | 2689 e-g | 68 ab | 3 f | 59 a | 19 de |
| 19-MU1-0116 | Mutant | 2658 e-g | 47 i | 4 f | 43 d-f | 30 bc |
| 19-MU1-0516 | Mutant | 2638 fg | 54 fg | 4 f | 41 d-f | 30 bc |
| TUFRunner 297 | Cultivar | 2254 g | 63 de | 40 d | 39 d-g | 16 de |
| $LSD_{0.05}$ | — | 471 | 3 | 5 | 8 | 7 |

Example 5—Values for $F_2$ Breeding Population Derived from Cross with Reduced-Fat Peanut Cultivar IPG 2309

FIG. 1 shows a frequency density histogram of total; fat (%) values for an $F_2$ breeding population derived from a cross between reduced-fat peanut cultivar IPG 2309 and Georgia-06G. In FIG. 1, triangle and circle represent the mean total fat content for the reduced-fat (28.1%) and normal-fat (38.6%) parents, respectively.

Figure 2:
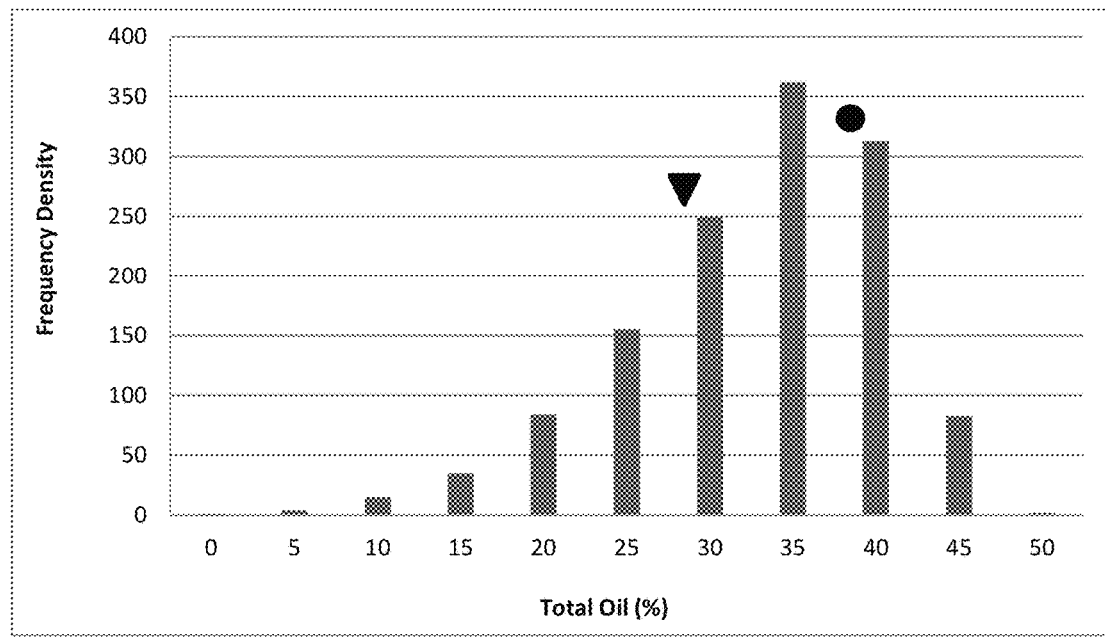
FIG. 2 shows a frequency density histogram of total oil (%) values for an $F_2$ breeding population derived from a cross between IPG 2309 and Georgia-06G (triangle and circle represent the mean total fat content for the reduced-fat (28.5%) and normal-fat (38.5%) parents, respectively).

FIG. 2 shows a frequency density histogram of total oil (%) values for an $F_2$ breeding population derived from a cross between IPG 2309 and Georgia-06G (triangle and circle represent the mean total fat content for the reduced-fat (28.5%) and normal-fat (38.5%) parents, respectively).

Table 8 shows a chi-square analyses of individual phenotypes for total fat content (%) against expected single- and two-gene ratios in an *Arachis hypogaea* L. $F_2$ population in Terry County, Texas, 2020. In Table 8, chi-square P-values greater than 0.05 indicate that observed values are not significantly different than expected values.

Table 9 shows Chi-square analyses of individual phenotypes for oil content (%) against expected single- and two-gene ratios in an *Arachis hypogaea* L. $F_2$ population, Terry County, Texas, 2020. In Table 9, chi-square P-values greater than 0.05 indicate that observed values are not significantly different than expected values.

TABLE 8

| Parentage | N | Phenotypic Ratio | Observed | | | Expected | | | $\chi^2$ | P |
|---|---|---|---|---|---|---|---|---|---|---|
| | | | Normal | Int | Low | Normal | Int | Low | | |
| IPG 2309 × Georgia-06G | 1097 | 3:1 | 799 | — | 298 | 823 | — | 274 | 2.74 | 0.097 |
| | | 1:2:1 | 666 | 212 | 219 | 274 | 549 | 274 | 777.16 | 0.000 |
| | | 15:1 | 799 | — | 298 | 1028 | — | 69 | 818.97 | 0.000 |
| | | 9:4:3 | 666 | 212 | 219 | 617 | 274 | 206 | 18.87 | 0.000 |
| | | 9:7 | 799 | — | 298 | 617 | — | 480 | 122.61 | 0.000 |
| | | 12:3:1 | 666 | 212 | 219 | 823 | 206 | 69 | 360.14 | 0.000 |
| | | 13:3 | 799 | — | 298 | 891 | — | 206 | 50.99 | 0.000 |
| | | 9:6:1 | 666 | 212 | 219 | 617 | 411 | 69 | 430.59 | 0.000 |
| | | 7:6:3 | 666 | 212 | 219 | 480 | 411 | 206 | 169.62 | 0.000 |
| | | 11:5 | 799 | — | 298 | 754 | — | 343 | 8.52 | 0.003 |

TABLE 9

| Parentage | N | Phenotypic Ratio | Observed | | | Expected | | | $\chi^2$ | P |
|---|---|---|---|---|---|---|---|---|---|---|
| | | | Normal | Int | Low | Normal | Int | Low | | |
| IPG 2309 × Georgia-06G | 1097 | 3:1 | 800 | — | 297 | 823 | — | 274 | 2.52 | 0.112 |
| | | 1:2:1 | 663 | 216 | 218 | 274 | 549 | 274 | 764.15 | 0.000 |
| | | 15:1 | 800 | — | 297 | 1028 | — | 69 | 811.85 | 0.000 |
| | | 9:4:3 | 663 | 216 | 218 | 617 | 274 | 206 | 16.53 | 0.000 |
| | | 9:7 | 800 | — | 297 | 617 | — | 480 | 123.96 | 0.000 |
| | | 12:3:1 | 663 | 216 | 218 | 823 | 206 | 69 | 357.25 | 0.000 |
| | | 13:3 | 800 | — | 297 | 891 | — | 206 | 49.89 | 0.000 |
| | | 9:6:1 | 663 | 216 | 218 | 617 | 411 | 69 | 421.92 | 0.000 |
| | | 7:6:3 | 663 | 216 | 218 | 480 | 411 | 206 | 163.35 | 0.000 |
| | | 11:5 | 800 | — | 297 | 754 | — | 343 | 8.91 | 0.002 |

From an analysis of the data set forth in the above tables, the following conclusions concerning the fat and oil content of the mutant lines of the present invention and of the germplasm accessions can be made.

The reduced fat content of mutant line IPG 2309 is from about 27.9% to about 39.57%.

The lowest fat content for the mutant lines is 20.91% for 19-MU1-0312.

The highest fat content for the mutant lines is 45.05% for 18-MU1-2109.

The lowest oil content for the mutant lines is 28.1% for IPG 2309.

The highest oil content for the mutant lines is 36.92% for 18-MU1-2109.

The lowest fat content for germplasm accessions or runner-type cultivars is 43.3% for PI268755.

The lowest oil content for germplasm accessions or runner-type cultivars is 31.20% for PI497517.

The lowest fat content for Applicant's own advanced runner-type lines is 34.69% for 17-2-0107.

The lowest oil content for Applicant's own advanced runner-type lines is 29.81% for 17-1-0714.

From an analysis of the data set forth in the above tables, the following conclusions concerning the percent decrease or increase in the fat and oil content of the mutant lines of the present invention and of the germplasm accessions can be made. The percent decrease was determined by the equation:

$$\text{Percent decrease} = ((\text{original(comparison)\#} - \text{new(mutant)\#})/\text{original \#}) * 100$$

Table 1: comparison of IPG 2309 with progenitor and standard cultivars.

Fat low TUFRunner297 43.4—IPG 2309 31.6=27.2% decrease

Fat high ACI 236 45.6—IPG 2309 31.6=30.7% decrease

Oil low TUFRunner297 38.0—IPG 2309 28.1=26% decrease

Oil high ACI236 39.9—IPG 2309 28.1=29.6% decrease

Table 2: comparison of IPG 2309 with public germplasm accessions.

Fat low P1262038 45.07—IPG 2309 39.57=12.2% decrease

Fat high P1274193 50.89—IPG 2309 39.57=22.2% decrease

Oil low P1262038 36.85—IPG 2309 35.73=3% decrease

Oil high PI476025 45.01—IPG 2309 35.73=20.6% decrease

Table 3: comparison of mutant lines with public germplasm accessions.

Fat high PI478819 47.7—fat low 19-MU1-0312 20.91=56.2% decrease

Oil low PI497517 31.2—oil high 19-MU1-0223 34.80=11.5% increase

Oil high P1274193 41.34—oil low IPG 2309 29.25=29.2% decrease

Table 4: comparison of mutant lines with Applicant's advanced runner-types.

Fat low 17-2-0107 34.69—fat high 18-MU1-2109 45.05=29.86% increase

Fat low 17-2-0107 34.69—fat $2^{nd}$ highest 18-MU1-0905 36.1=4.1% increase

Fat high 18-1-0909 41.88—fat low 19-MU1-0312 20.91=50.1% decrease

Oil low 17-1-0714 29.81—oil high 18-MU1-2109 36.92=23.8% increase

Oil low 17-1-0714 29.81—oil $2^{nd}$ highest 19-MU1-0223 34.8=16.74% increase

Oil high 18-1-0206 35.57—oil low IPG 2309 29.25=17.77% decrease

Example 6—Additional Mutant Lines and Genetic Identification of Reduced-Fat Trait Efforts to develop and screen new mutant peanut germplasm are ongoing; new mutant population development will remain continuous. All mutant populations and uniform lines harvested in 2020 are currently being screened for novel fat content, protein content, and simple sugar content. Other reduced-fat lines have been identified as possible reduced-fat lines and are currently awaiting validation in the 2020 material. Crosses were also made between IPG 2309 and two normal-fat cultivars in 2019 to introgress the reduced-fat trait into elite germplasm. The resultant $F_2$ breeding populations harvested in 2020 exhibited successful introgression of the reduced-fat trait into the $F_2$ progeny. Two additional crosses were made in 2020 between IPG 2309 and two commercial cultivars. Thus, these four families were created to develop elite, adapted cultivars with the reduced-fat trait—this is a long-term, ongoing process that typically requires 8-10 years to complete in a pedigree breeding program.

In reviewing the $F_2$ data, the reduced-fat trait appears consistently to be a dominant trait. The only two ratios that the $F_2$ data fit were both two-gene epistasis ratios of 9:7 and 7:6:3; however, the data best fit a 9:7 ratio (P-0.839), suggesting that reduced-fat trait is the result of complementary gene interaction, where at least one dominant allele from each of two genes is needed for the reduced-fat phenotype.

The IPG 2309 mutant line and other mutant lines will also be sequenced in order to determine the sequence of the mutant allele(s) and identify its locus in the peanut genome. This will also result in single-nucleotide polymorphism (SNP) markers that will aid in genotypic selection of the reduced-fat trait. The availability and utility of such a marker (or markers) would allow for the rapid, efficient introgression of the reduced-fat trait into a number of different genetic backgrounds through marker-assisted selection (for new cultivar development) and marker-assisted backcrossing (for conversion of existing cultivars). The goal of International Peanut Group (IPG) is to introgress the reduced-fat trait into a number of different cultivars, to provide specialty cultivar options with elite agronomic potential for value-added peanut production in numerous origins in the U.S. and abroad.

Additional efforts are currently ongoing to develop and identify mutant germplasm with novel protein content and simple sugar content. Also, high-fat germplasm has been identified and is in the process of being propagated for more extensive evaluation and validation. IPG has developed rapid, inexpensive assays for both protein and simple sugar content in peanut kernels that have sufficiently-robust correlations with the analytical reference methods for each characteristic. These assays will allow for the quick, widespread screening of IPG's entire germplasm base each year for identification of novel germplasm.

It should be understood that peanut plants that produce seed containing reduced-fat, can, through routine manipulation of cytoplasmic or other factors, be produced in a male-sterile form. Such embodiments are also contemplated within the scope of the present claims.

As used herein, the term plant includes plant cells, plant protoplasts, plant cell tissue cultures from which peanut plants can be regenerated, plant calli, plant clumps and plant cells that are intact in plants or parts of plants, such as embryos, pollen, ovules, flowers, glumes, panicles, leaves, stems, roots, root tips, anthers, pistils and the like.

The use of the terms "a," "an," and "the," and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

DEPOSIT INFORMATION

A deposit of the proprietary peanut seed cultivar IPG 2309 having reduced-fat content of this invention and as recited in the claims has been made with the Provasoli-Guillard National Center for Marine Algae and Microbiota (NCMA) (60 Bigelow Drive, East Boothbay, ME 04544). The date of deposit was Jan. 9, 2024. The deposit of 625 seeds was taken from the same deposit maintained by International Peanut Group (1995 #B County Road 290, Brownfield, Texas 79316) since prior to the filing date of this application. All restrictions will be irrevocably removed upon granting of a patent, and the deposit is intended to meet all of the requirements of 37 C.F.R. §§ 1.801-1.809. The Accession Number provided by the NCMA International Depositary Authority is NCMA 202401001. The deposit will be maintained in the depository for a period of thirty years, or five years after the last request, or for the enforceable life of the patent, whichever is longer, and will be replaced as necessary during that period.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A peanut seed of the cultivar IPG 2309, a representative sample of seed of said cultivar having been deposited under National Center for Marine Algae and Microbiota (NCMA) Accession No. 202401001.

2. A peanut plant, or a part thereof, produced by growing the seed of claim 1.

3. A tissue culture produced from protoplasts or cells from the peanut plant, or part thereof, of claim 2, wherein said cells or protoplasts are produced from a plant part selected from the group consisting of leaf, pollen, ovule, embryo, cotyledon, hypocotyl, meristematic cell, root, root tip, pistil, anther, flower, seed, pedicel, stem, and petiole.

4. A peanut plant regenerated from the tissue culture of claim 3, wherein the regenerated peanut plant otherwise has all the physiological and morphological characteristics of peanut cultivar IPG 2309.

5. A method for producing a peanut seed, said method comprising crossing two peanut plants and harvesting the resultant peanut seed, wherein at least one peanut plant is the peanut plant of claim 2.

6. A peanut seed produced by the method of claim 5.

7. A peanut plant, or a part thereof, produced by growing said seed of claim 6.

8. The method of claim 5, wherein at least one of said peanut plants is transgenic.

9. A method of producing an herbicide resistant peanut plant, wherein said method comprises introducing a gene conferring herbicide resistance into the plant of claim 2.

10. An herbicide resistant peanut plant produced by the method of claim 9, wherein the herbicide resistant peanut plant otherwise has all the physiological and morphological characteristics of peanut cultivar IPG 2309.

11. A method of producing a pest or insect resistant peanut plant, wherein said method comprises introducing a gene conferring pest or insect resistance into the peanut plant of claim 2.

12. A pest or insect resistant peanut plant produced by the method of claim 11, wherein the pest or insect resistant peanut plant otherwise has all the physiological and morphological characteristics of peanut cultivar IPG 2309.

13. A method of producing a disease resistant peanut plant, wherein said method comprises introducing a gene which confers disease resistance into the peanut plant of claim 2.

14. A disease resistant peanut plant produced by the method of claim 13, wherein the disease resistant peanut plant otherwise has all the physiological and morphological characteristics of peanut cultivar IPG 2309.

15. A method of producing a peanut plant with a desired trait, wherein the method comprises introducing a gene mutation via chemical mutagenesis into the peanut plant of claim 2.

16. A peanut plant produced by the method of claim 15, wherein the peanut plant otherwise has all the physiological and morphological characteristics of peanut cultivar IPG 2309.

17. A method of introducing a desired trait into the plant of claim 2, wherein the method comprises:
 a. crossing a plant of claim 2 with a plant of another peanut cultivar that comprises a desired trait, wherein the desired trait is selected from the group consisting of low pod-splitting, herbicide resistance, insect resistance, modified fatty acid content, modified seed yield, modified oil percent, modified protein percent, modified fancy pod percent, modified pod size, shape, or color, and resistance to bacterial disease, fungal disease or viral disease;
 b. selecting one or more progeny plants that have the desired trait to produce selected progeny plants;
 c. backcrossing the selected progeny plants with either parent cultivar to produce backcross progeny plants;

d. selecting for backcross progeny plants that have the desired trait and produce seeds having a fat content of from 27.9% to 39.57%; and e. repeating steps (c) and (d) two or more times in succession to produce selected third or higher backcross progeny plants that comprise the desired trait and produce seeds having a fat content of from 27.9% to 39.57%.

18. A peanut plant produced by the method of claim 17, wherein the plant has the desired trait and produces seed having a fat content of from 27.9% to 39.57%.

19. The peanut plant of claim 18, wherein the desired trait is disease resistance and the resistance is selected from the group consisting of southern stem rot, late leaf spot, cylindrocladium black rot, sclerotinia blight, early leaf spot, tomato spotted wilt virus, and pod rot complex.

20. The peanut plant of claim 18, wherein the desired trait is insect resistance and the insect resistance is selected from the group consisting of thrips, southern corn rootworm, burrowing bug, lesser cornstalk borer, leaf hopper, aphid, and nematode.

21. The peanut plant of claim 18, wherein the desired trait is modified fatty acid content and the fatty acids are selected from the group consisting of oleic acid, linoleic acid, and palmitic acid.

22. A method of producing a genetically modified peanut plant, wherein the method comprises mutation, transformation, gene conversion, genome editing, RNA interference or gene silencing of the plant of claim 2.

23. A genetically modified peanut plant produced by the method of claim 22, wherein the plant comprises the genetic modification and produces seed having a reduced-fat content of from about 27.9% to about 39.57%; and wherein the genetically modified peanut plant otherwise has all the physiological and morphological characteristics of peanut cultivar IPG 2309.

24. A method of producing a commodity plant product comprising obtaining the seed of claim 1 and producing a commodity plant product from said seed, wherein the commodity plant product is selected from the group consisting of edible oil, peanut butter, shelled roasted nuts, unshelled roasted nuts, salted nuts, raw nuts, confectionery products, flour, livestock feed, biodiesel, fuel, mulch, manufacturing particle board, and fertilizer.

25. The commodity plant product of claim 24.

* * * * *